United States Patent
Gupta et al.

(10) Patent No.: US 12,456,816 B2
(45) Date of Patent: Oct. 28, 2025

(54) WAVEGUIDE WITH SLOT ANTENNAS AND REFLECTORS

(71) Applicant: Aptiv Technologies AG, Schaffhausen (CH)

(72) Inventors: Biswadeep Das Gupta, Noblesville, IN (US); Syed An Nazmus Saqueb, Westfield, IN (US); Scott D. Brandenburg, Kokomo, IN (US); David Wayne Zimmerman, Noblesville, IN (US); Warren Whithaus, Fishers, IN (US)

(73) Assignee: Aptiv Technologies AG, Schaffhausen (CH)

( * ) Notice: Subject to any disclaimer, the term of this patent is extended or adjusted under 35 U.S.C. 154(b) by 656 days.

(21) Appl. No.: 17/809,116

(22) Filed: Jun. 27, 2022

(65) Prior Publication Data

US 2023/0352845 A1 Nov. 2, 2023

Related U.S. Application Data

(60) Provisional application No. 63/363,997, filed on May 2, 2022.

(51) Int. Cl.
*H01Q 13/18* (2006.01)
*G01S 13/931* (2020.01)
(Continued)

(52) U.S. Cl.
CPC ........... *H01Q 13/18* (2013.01); *G01S 13/931* (2013.01); *H01Q 1/3233* (2013.01); *H01Q 19/10* (2013.01); *H01Q 21/08* (2013.01)

(58) Field of Classification Search
CPC .... G01S 13/931; H01Q 1/3233; H01Q 13/18; H01Q 19/10; H01Q 19/185; H01Q 21/005; H01Q 21/08
See application file for complete search history.

(56) References Cited

U.S. PATENT DOCUMENTS

| | | |
|---|---|---|
| 2,851,686 A | 9/1958 | Hagaman |
| 3,029,432 A | 4/1962 | Hansen |
| (Continued) | | |

FOREIGN PATENT DOCUMENTS

| | | |
|---|---|---|
| CA | 2654470 A1 | 12/2007 |
| CN | 1254446 A | 5/2000 |
| (Continued) | | |

OTHER PUBLICATIONS

"Extended European Search Report", EP Application No. 18153137. 7, Jun. 15, 2018, 8 pages.

(Continued)

*Primary Examiner* — Timothy A Brainard
(74) *Attorney, Agent, or Firm* — Harness, Dickey & Pierce, P.L.C.

(57) ABSTRACT

This document describes techniques, apparatuses, and systems for a waveguide with slot antennas and reflectors. An apparatus may include a waveguide channel that includes a hollow channel containing a dielectric and an array of slot antennas through a surface that is operably connected with the dielectric. The apparatus also includes reflectors positioned adjacent to and offset from each longitudinal side of the waveguide channel. The reflectors and the waveguide channel are positioned to generate a particular radiation pattern for an antenna element electrically coupled to the dielectric. In this way, the described waveguide with slot antennas and reflectors can adjust the positioning of the reflectors to provide a radiation pattern with a wide or asymmetric beamwidth.

18 Claims, 11 Drawing Sheets

(51) Int. Cl.
*H01Q 1/32* (2006.01)
*H01Q 19/10* (2006.01)
*H01Q 21/08* (2006.01)

(56) References Cited

U.S. PATENT DOCUMENTS

| | | | |
|---|---|---|---|
| 3,032,762 A | 5/1962 | Kerr | |
| 3,328,800 A | 6/1967 | Algeo | |
| 3,462,713 A | 8/1969 | Knerr | |
| 3,473,162 A | 10/1969 | Veith | |
| 3,579,149 A | 5/1971 | Ramsey | |
| 3,594,806 A | 7/1971 | Black et al. | |
| 3,597,710 A | 8/1971 | Levy | |
| 3,852,689 A | 12/1974 | Watson | |
| 4,157,516 A | 6/1979 | Grijp | |
| 4,291,312 A | 9/1981 | Kaloi | |
| 4,453,142 A | 6/1984 | Murphy | |
| 4,562,416 A | 12/1985 | Sedivec | |
| 4,590,480 A | 5/1986 | Nikolayuk et al. | |
| 4,839,663 A | 6/1989 | Kurtz | |
| 5,030,965 A | 7/1991 | Park et al. | |
| 5,047,738 A | 9/1991 | Wong et al. | |
| 5,065,123 A | 11/1991 | Heckaman et al. | |
| 5,068,670 A | 11/1991 | Maoz | |
| 5,113,197 A | 5/1992 | Luh | |
| 5,337,065 A | 8/1994 | Bonnet et al. | |
| 5,350,499 A | 9/1994 | Shibaike et al. | |
| 5,424,745 A * | 6/1995 | Fonsny | G01S 13/56 342/28 |
| 5,541,612 A | 7/1996 | Josefsson | |
| 5,638,079 A | 6/1997 | Kastner et al. | |
| 5,923,225 A | 7/1999 | Santos | |
| 5,926,147 A | 7/1999 | Sehm et al. | |
| 5,982,256 A | 11/1999 | Uchimura et al. | |
| 5,986,527 A | 11/1999 | Ishikawa et al. | |
| 6,072,375 A | 6/2000 | Adkins et al. | |
| 6,166,701 A | 12/2000 | Park et al. | |
| 6,414,573 B1 | 7/2002 | Swineford et al. | |
| 6,489,855 B1 | 12/2002 | Kitamori et al. | |
| 6,502,822 B1 * | 1/2003 | Brown | B21D 26/045 72/58 |
| 6,535,083 B1 | 3/2003 | Hageman et al. | |
| 6,622,370 B1 | 9/2003 | Sherman et al. | |
| 6,788,918 B2 | 9/2004 | Saitoh et al. | |
| 6,794,950 B2 | 9/2004 | Toit et al. | |
| 6,859,114 B2 | 2/2005 | Eleftheriades et al. | |
| 6,867,660 B2 | 3/2005 | Kitamori et al. | |
| 6,958,662 B1 | 10/2005 | Salmela et al. | |
| 6,992,541 B2 | 1/2006 | Wright et al. | |
| 7,002,511 B1 | 2/2006 | Ammar et al. | |
| 7,091,919 B2 | 8/2006 | Bannon | |
| 7,142,165 B2 | 11/2006 | Sanchez et al. | |
| 7,420,442 B1 | 9/2008 | Forman | |
| 7,439,822 B2 | 10/2008 | Shimura et al. | |
| 7,495,532 B2 | 2/2009 | McKinzie, III | |
| 7,498,994 B2 | 3/2009 | Vacanti | |
| 7,626,476 B2 | 12/2009 | Kim et al. | |
| 7,659,799 B2 | 2/2010 | Jun et al. | |
| 7,886,434 B1 | 2/2011 | Forman | |
| 7,973,616 B2 | 7/2011 | Shijo et al. | |
| 7,994,879 B2 | 8/2011 | Kim et al. | |
| 8,013,694 B2 | 9/2011 | Hiramatsu et al. | |
| 8,089,327 B2 | 1/2012 | Margomenos et al. | |
| 8,159,316 B2 | 4/2012 | Miyazato et al. | |
| 8,395,552 B2 | 3/2013 | Geiler et al. | |
| 8,451,175 B2 | 5/2013 | Gummalla et al. | |
| 8,451,189 B1 | 5/2013 | Fluhler | |
| 8,576,023 B1 | 11/2013 | Buckley et al. | |
| 8,604,990 B1 | 12/2013 | Chen et al. | |
| 8,692,731 B2 | 4/2014 | Lee et al. | |
| 8,717,124 B2 | 5/2014 | Vanhille et al. | |
| 8,803,638 B2 | 8/2014 | Kildal | |
| 8,948,562 B2 | 2/2015 | Norris et al. | |
| 9,007,269 B2 | 4/2015 | Lee et al. | |
| 9,203,139 B2 | 12/2015 | Zhu et al. | |
| 9,203,155 B2 | 12/2015 | Choi et al. | |
| 9,246,204 B1 | 1/2016 | Kabakian | |
| 9,258,884 B2 | 2/2016 | Saito | |
| 9,356,238 B2 | 5/2016 | Norris et al. | |
| 9,368,878 B2 | 6/2016 | Chen et al. | |
| 9,450,281 B2 | 9/2016 | Kim | |
| 9,537,212 B2 | 1/2017 | Rosen et al. | |
| 9,647,313 B2 | 5/2017 | Marconi et al. | |
| 9,653,773 B2 | 5/2017 | Ferrari et al. | |
| 9,653,819 B1 | 5/2017 | Izadian | |
| 9,673,532 B2 | 6/2017 | Cheng et al. | |
| 9,806,393 B2 | 10/2017 | Kildal et al. | |
| 9,806,431 B1 | 10/2017 | Izadian | |
| 9,813,042 B2 | 11/2017 | Xue et al. | |
| 9,843,301 B1 | 12/2017 | Rodgers et al. | |
| 9,882,288 B2 | 1/2018 | Black et al. | |
| 9,935,065 B1 | 4/2018 | Baheti et al. | |
| 9,991,606 B2 | 6/2018 | Kirino et al. | |
| 9,997,842 B2 | 6/2018 | Kirino et al. | |
| 10,027,032 B2 | 7/2018 | Kirino et al. | |
| 10,042,045 B2 | 8/2018 | Kirino et al. | |
| 10,090,600 B2 | 10/2018 | Kirino et al. | |
| 10,114,067 B2 | 10/2018 | Lam et al. | |
| 10,153,533 B2 | 12/2018 | Kirino | |
| 10,158,158 B2 | 12/2018 | Kirino et al. | |
| 10,164,318 B2 | 12/2018 | Seok et al. | |
| 10,164,344 B2 | 12/2018 | Kirino et al. | |
| 10,186,787 B1 | 1/2019 | Wang et al. | |
| 10,218,078 B2 | 2/2019 | Kirino et al. | |
| 10,230,173 B2 | 3/2019 | Kirino et al. | |
| 10,263,310 B2 | 4/2019 | Kildal et al. | |
| 10,283,832 B1 | 5/2019 | Chayat et al. | |
| 10,312,596 B2 | 6/2019 | Gregoire | |
| 10,315,578 B2 | 6/2019 | Kim et al. | |
| 10,320,083 B2 | 6/2019 | Kirino et al. | |
| 10,333,227 B2 | 6/2019 | Kirino et al. | |
| 10,374,323 B2 | 8/2019 | Kamo et al. | |
| 10,381,317 B2 | 8/2019 | Maaskant et al. | |
| 10,381,741 B2 | 8/2019 | Kirino et al. | |
| 10,439,298 B2 | 10/2019 | Kirino et al. | |
| 10,468,736 B2 | 11/2019 | Mangaiahgari | |
| 10,505,282 B2 | 12/2019 | Lilja | |
| 10,534,061 B2 | 1/2020 | Vassilev et al. | |
| 10,559,889 B2 | 2/2020 | Kirino et al. | |
| 10,594,045 B2 | 3/2020 | Kirino et al. | |
| 10,601,144 B2 | 3/2020 | Kamo et al. | |
| 10,608,345 B2 | 3/2020 | Kirino et al. | |
| 10,613,216 B2 | 4/2020 | Vacanti et al. | |
| 10,622,696 B2 | 4/2020 | Kamo et al. | |
| 10,627,502 B2 | 4/2020 | Kirino et al. | |
| 10,649,461 B2 | 5/2020 | Han et al. | |
| 10,651,138 B2 | 5/2020 | Kirino et al. | |
| 10,651,567 B2 | 5/2020 | Kamo et al. | |
| 10,658,760 B2 | 5/2020 | Kamo et al. | |
| 10,670,810 B2 | 6/2020 | Sakr et al. | |
| 10,705,294 B2 | 7/2020 | Guerber et al. | |
| 10,707,584 B2 | 7/2020 | Kirino et al. | |
| 10,714,802 B2 | 7/2020 | Kirino et al. | |
| 10,727,561 B2 | 7/2020 | Kirino et al. | |
| 10,727,611 B2 | 7/2020 | Kirino et al. | |
| 10,763,590 B2 | 9/2020 | Kirino et al. | |
| 10,763,591 B2 | 9/2020 | Kirino et al. | |
| 10,775,573 B1 | 9/2020 | Hsu et al. | |
| 10,811,373 B2 | 10/2020 | Zaman et al. | |
| 10,826,147 B2 | 11/2020 | Sikina et al. | |
| 10,833,382 B2 | 11/2020 | Sysouphat | |
| 10,833,385 B2 | 11/2020 | Mangaiahgari | |
| 10,892,536 B2 | 1/2021 | Fan et al. | |
| 10,944,184 B2 | 3/2021 | Shi et al. | |
| 10,957,971 B2 | 3/2021 | Doyle et al. | |
| 10,957,988 B2 | 3/2021 | Kirino et al. | |
| 10,962,628 B1 | 3/2021 | Laifenfeld et al. | |
| 10,971,824 B2 | 4/2021 | Baumgartner et al. | |
| 10,983,194 B1 | 4/2021 | Patel et al. | |
| 10,985,434 B2 | 4/2021 | Wagner et al. | |
| 10,992,056 B2 | 4/2021 | Kamo et al. | |
| 11,061,110 B2 | 7/2021 | Kamo et al. | |
| 11,088,432 B2 | 8/2021 | Seok et al. | |
| 11,088,464 B2 | 8/2021 | Sato et al. | |

(56) References Cited

U.S. PATENT DOCUMENTS

| | | |
|---|---|---|
| 11,114,733 B2 | 9/2021 | Doyle et al. |
| 11,121,441 B1 | 9/2021 | Rmili et al. |
| 11,121,475 B2 | 9/2021 | Yang et al. |
| 11,169,325 B2 | 11/2021 | Guerber et al. |
| 11,171,399 B2 | 11/2021 | Alexanian et al. |
| 11,196,171 B2 | 12/2021 | Doyle et al. |
| 11,201,414 B2 | 12/2021 | Doyle et al. |
| 11,249,011 B2 | 2/2022 | Challener |
| 11,283,162 B2 | 3/2022 | Doyle et al. |
| 11,289,787 B2 | 3/2022 | Yang |
| 11,349,183 B2 | 5/2022 | Rahiminejad et al. |
| 11,349,220 B2 | 5/2022 | Alexanian et al. |
| 11,378,683 B2 | 7/2022 | Alexanian et al. |
| 11,411,292 B2 | 8/2022 | Kirino |
| 11,444,364 B2 | 9/2022 | Shi |
| 11,495,871 B2 | 11/2022 | Vosoogh et al. |
| 11,563,259 B2 | 1/2023 | Alexanian et al. |
| 11,611,138 B2 | 3/2023 | Ogawa et al. |
| 11,616,282 B2 | 3/2023 | Yao et al. |
| 11,626,652 B2 | 4/2023 | Vilenskiy et al. |
| 2002/0021197 A1 | 2/2002 | Elco |
| 2003/0052828 A1 | 3/2003 | Scherzer et al. |
| 2003/0080907 A1* | 5/2003 | Wang .................. H01Q 19/175 343/757 |
| 2004/0041663 A1 | 3/2004 | Uchimura et al. |
| 2004/0069984 A1 | 4/2004 | Estes et al. |
| 2004/0090290 A1 | 5/2004 | Teshirogi et al. |
| 2004/0174315 A1 | 9/2004 | Miyata |
| 2005/0146474 A1 | 7/2005 | Bannon |
| 2005/0237253 A1 | 10/2005 | Kuo et al. |
| 2006/0001577 A1* | 1/2006 | Smith .................. H01Q 13/10 343/702 |
| 2006/0038724 A1 | 2/2006 | Tikhov et al. |
| 2006/0113598 A1 | 6/2006 | Chen et al. |
| 2006/0158382 A1 | 7/2006 | Nagai |
| 2007/0013598 A1 | 1/2007 | Artis et al. |
| 2007/0054064 A1 | 3/2007 | Ohmi et al. |
| 2007/0103381 A1 | 5/2007 | Upton |
| 2008/0129409 A1 | 6/2008 | Nagaishi et al. |
| 2008/0150821 A1 | 6/2008 | Koch et al. |
| 2009/0040132 A1 | 2/2009 | Sridhar et al. |
| 2009/0207090 A1 | 8/2009 | Pettus et al. |
| 2009/0243762 A1 | 10/2009 | Chen et al. |
| 2009/0243766 A1 | 10/2009 | Miyagawa et al. |
| 2009/0300901 A1 | 12/2009 | Artis et al. |
| 2010/0060521 A1* | 3/2010 | Hayes .................. H01Q 25/00 343/834 |
| 2010/0134376 A1 | 6/2010 | Margomenos et al. |
| 2010/0321265 A1 | 12/2010 | Yamaguchi et al. |
| 2011/0181482 A1 | 7/2011 | Adams et al. |
| 2012/0013421 A1 | 1/2012 | Hayata |
| 2012/0050125 A1 | 3/2012 | Leiba et al. |
| 2012/0056776 A1 | 3/2012 | Shijo et al. |
| 2012/0068316 A1 | 3/2012 | Ligander |
| 2012/0163811 A1 | 6/2012 | Doany et al. |
| 2012/0194399 A1 | 8/2012 | Bily et al. |
| 2012/0242421 A1 | 9/2012 | Robin et al. |
| 2012/0256796 A1 | 10/2012 | Leiba |
| 2012/0280770 A1 | 11/2012 | Abhari et al. |
| 2013/0057358 A1 | 3/2013 | Anthony et al. |
| 2013/0082801 A1 | 4/2013 | Rofougaran et al. |
| 2013/0300602 A1 | 11/2013 | Zhou et al. |
| 2014/0015709 A1 | 1/2014 | Shijo et al. |
| 2014/0091884 A1 | 4/2014 | Flatters |
| 2014/0106684 A1 | 4/2014 | Burns et al. |
| 2014/0327491 A1 | 11/2014 | Kim et al. |
| 2015/0097633 A1 | 4/2015 | Devries et al. |
| 2015/0229017 A1 | 8/2015 | Suzuki et al. |
| 2015/0229027 A1 | 8/2015 | Sonozaki et al. |
| 2015/0263429 A1 | 9/2015 | Vahidpour et al. |
| 2015/0333726 A1 | 11/2015 | Xue et al. |
| 2015/0357698 A1 | 12/2015 | Kushta |
| 2015/0364804 A1 | 12/2015 | Tong et al. |
| 2015/0364830 A1 | 12/2015 | Tong et al. |
| 2016/0043455 A1 | 2/2016 | Seler et al. |
| 2016/0049714 A1 | 2/2016 | Ligander et al. |
| 2016/0056541 A1 | 2/2016 | Tageman et al. |
| 2016/0118705 A1 | 4/2016 | Tang et al. |
| 2016/0126637 A1 | 5/2016 | Uemichi |
| 2016/0195612 A1 | 7/2016 | Shi |
| 2016/0204495 A1 | 7/2016 | Takeda et al. |
| 2016/0204496 A1* | 7/2016 | Hobden .................. G01S 7/034 342/175 |
| 2016/0211582 A1 | 7/2016 | Saraf |
| 2016/0276727 A1 | 9/2016 | Dang et al. |
| 2016/0293557 A1 | 10/2016 | Topak et al. |
| 2016/0301125 A1 | 10/2016 | Kim et al. |
| 2017/0003377 A1 | 1/2017 | Menge |
| 2017/0012335 A1 | 1/2017 | Boutayeb |
| 2017/0084554 A1 | 3/2017 | Dogiamis et al. |
| 2017/0288313 A1 | 10/2017 | Chung et al. |
| 2017/0294719 A1 | 10/2017 | Tatomir |
| 2017/0324135 A1 | 11/2017 | Blech et al. |
| 2018/0013208 A1 | 1/2018 | Izadian et al. |
| 2018/0032822 A1 | 2/2018 | Frank et al. |
| 2018/0123245 A1 | 5/2018 | Toda et al. |
| 2018/0131084 A1 | 5/2018 | Park et al. |
| 2018/0212324 A1 | 7/2018 | Tatomir |
| 2018/0226709 A1 | 8/2018 | Mangaiahgari |
| 2018/0233465 A1 | 8/2018 | Spella et al. |
| 2018/0254563 A1 | 9/2018 | Sonozaki et al. |
| 2018/0284186 A1 | 10/2018 | Chadha et al. |
| 2018/0301819 A1 | 10/2018 | Kirino et al. |
| 2018/0301820 A1 | 10/2018 | Bregman et al. |
| 2018/0343711 A1 | 11/2018 | Wixforth et al. |
| 2018/0351261 A1 | 12/2018 | Kamo et al. |
| 2018/0375185 A1 | 12/2018 | Kirino et al. |
| 2019/0006743 A1 | 1/2019 | Kirino et al. |
| 2019/0013563 A1 | 1/2019 | Takeda et al. |
| 2019/0057945 A1 | 2/2019 | Maaskant et al. |
| 2019/0109361 A1 | 4/2019 | Ichinose et al. |
| 2019/0115644 A1 | 4/2019 | Wang et al. |
| 2019/0187247 A1 | 6/2019 | Izadian et al. |
| 2019/0245276 A1 | 8/2019 | Li et al. |
| 2019/0252778 A1 | 8/2019 | Duan |
| 2019/0260137 A1 | 8/2019 | Watanabe et al. |
| 2019/0324134 A1 | 10/2019 | Cattle |
| 2020/0021001 A1 | 1/2020 | Mangaiahgari |
| 2020/0044360 A1 | 2/2020 | Kamo et al. |
| 2020/0059002 A1 | 2/2020 | Renard et al. |
| 2020/0064483 A1 | 2/2020 | Li et al. |
| 2020/0076086 A1 | 3/2020 | Cheng et al. |
| 2020/0106171 A1 | 4/2020 | Shepeleva et al. |
| 2020/0112077 A1 | 4/2020 | Kamo et al. |
| 2020/0136225 A1* | 4/2020 | Shi .......................... H01L 23/66 |
| 2020/0166637 A1 | 5/2020 | Hess et al. |
| 2020/0203849 A1 | 6/2020 | Lim et al. |
| 2020/0212594 A1 | 7/2020 | Kirino et al. |
| 2020/0235453 A1 | 7/2020 | Lang |
| 2020/0284907 A1 | 9/2020 | Gupta et al. |
| 2020/0287293 A1 | 9/2020 | Shi et al. |
| 2020/0319293 A1 | 10/2020 | Kuriyama et al. |
| 2020/0343612 A1 | 10/2020 | Shi |
| 2020/0346581 A1 | 11/2020 | Lawson et al. |
| 2020/0373678 A1 | 11/2020 | Park et al. |
| 2021/0025971 A1* | 1/2021 | Talai .................. G01S 13/003 |
| 2021/0028528 A1 | 1/2021 | Alexanian et al. |
| 2021/0036393 A1 | 2/2021 | Mangaiahgari |
| 2021/0104818 A1 | 4/2021 | Li et al. |
| 2021/0110217 A1 | 4/2021 | Gunel |
| 2021/0159577 A1 | 5/2021 | Carlred et al. |
| 2021/0218154 A1 | 7/2021 | Shi et al. |
| 2021/0242581 A1 | 8/2021 | Rossiter et al. |
| 2021/0249777 A1 | 8/2021 | Alexanian et al. |
| 2021/0305667 A1 | 9/2021 | Bencivenni |
| 2022/0094071 A1 | 3/2022 | Doyle et al. |
| 2022/0109246 A1 | 4/2022 | Emanuelsson et al. |
| 2022/0196794 A1 | 6/2022 | Foroozesh et al. |

FOREIGN PATENT DOCUMENTS

| | | |
|---|---|---|
| CN | 1620738 A | 5/2005 |
| CN | 2796131 | 7/2006 |
| CN | 101584080 A | 11/2009 |

(56) References Cited

FOREIGN PATENT DOCUMENTS

| | | |
|---|---|---|
| CN | 201383535 | 1/2010 |
| CN | 201868568 U | 6/2011 |
| CN | 102157787 A | 8/2011 |
| CN | 102420352 A | 4/2012 |
| CN | 103326125 A | 9/2013 |
| CN | 203277633 U | 11/2013 |
| CN | 103490168 A | 1/2014 |
| CN | 103515682 A | 1/2014 |
| CN | 102142593 B | 6/2014 |
| CN | 104101867 A | 10/2014 |
| CN | 104900956 A | 9/2015 |
| CN | 104993254 A | 10/2015 |
| CN | 105071019 A | 11/2015 |
| CN | 105609909 A | 5/2016 |
| CN | 105680133 A | 6/2016 |
| CN | 105958167 A | 9/2016 |
| CN | 107317075 A | 11/2017 |
| CN | 108258392 A | 7/2018 |
| CN | 109286081 A | 1/2019 |
| CN | 109643856 A | 4/2019 |
| CN | 109980361 A | 7/2019 |
| CN | 110085990 A | 8/2019 |
| CN | 209389219 U | 9/2019 |
| CN | 110401022 A | 11/2019 |
| CN | 111123210 A | 5/2020 |
| CN | 111480090 A | 7/2020 |
| CN | 108376821 B | 10/2020 |
| CN | 110474137 B | 11/2020 |
| CN | 109326863 B | 12/2020 |
| CN | 112241007 A | 1/2021 |
| CN | 212604823 U | 2/2021 |
| CN | 112986951 A | 6/2021 |
| CN | 112290182 B | 7/2021 |
| CN | 113193323 B | 10/2021 |
| CN | 214706247 U | 11/2021 |
| DE | 112017006415 | 9/2019 |
| DE | 102019200893 A1 | 7/2020 |
| EP | 0174579 A2 | 3/1986 |
| EP | 0818058 A1 | 1/1998 |
| EP | 2267841 A1 | 12/2010 |
| EP | 2500978 A1 | 9/2012 |
| EP | 2843758 A1 | 3/2015 |
| EP | 2766224 B1 | 12/2018 |
| EP | 3460903 A1 | 3/2019 |
| EP | 3785995 A1 | 3/2021 |
| EP | 3862773 A1 | 8/2021 |
| EP | 4089840 A1 | 11/2022 |
| GB | 893008 A | 4/1962 |
| GB | 2463711 A | 3/2010 |
| GB | 2489950 A | 10/2012 |
| JP | 2000183222 A | 6/2000 |
| JP | 2003198242 A | 7/2003 |
| JP | 2003289201 A | 10/2003 |
| JP | 5269902 B2 | 8/2013 |
| JP | 2013187752 A | 9/2013 |
| JP | 2015216533 A | 12/2015 |
| KR | 20080044752 A | 5/2008 |
| KR | 1020080044752 A | 5/2008 |
| KR | 20080105396 A | 12/2008 |
| KR | 101092846 B1 | 12/2011 |
| KR | 102154338 B1 | 9/2020 |
| WO | 9934477 A1 | 7/1999 |
| WO | 2013189513 A1 | 12/2013 |
| WO | 2018003932 A1 | 1/2018 |
| WO | 2018052335 A1 | 3/2018 |
| WO | 2019085368 A1 | 5/2019 |
| WO | 2020082363 A1 | 4/2020 |
| WO | 2021072380 A1 | 4/2021 |
| WO | 2022122319 A1 | 6/2022 |
| WO | 2022225804 A1 | 10/2022 |

OTHER PUBLICATIONS

"Extended European Search Report", EP Application No. 20166797, Sep. 16, 2020, 11 pages.
"Extended European Search Report", EP Application No. 21211165.2, May 13, 2022, 12 pages.
"Extended European Search Report", EP Application No. 21211167.8, May 19, 2022, 10 pages.
"Extended European Search Report", EP Application No. 21211168.6, May 13, 2022, 11 pages.
"Extended European Search Report", EP Application No. 21211452.4, May 16, 2022, 10 pages.
"Extended European Search Report", EP Application No. 21211478.9, May 19, 2022, 10 pages.
"Extended European Search Report", EP Application No. 21212703.9, May 3, 2022, 13 pages.
"Extended European Search Report", EP Application No. 22160898.7, Aug. 4, 2022, 11 pages.
"Foreign Office Action", CN Application No. 201810122408.4, Jun. 2, 2021, 15 pages.
"Foreign Office Action", CN Application No. 201810122408.4, Oct. 18, 2021, 19 pages.
"WR-90 Waveguides", Pasternack Enterprises, Inc., 2016, Retrieved from https://web.archive.org/web/20160308205114/http://www.pasternack.com:80/wr-90-waveguides-category.aspx, 2 pages.
Alhuwaimel, et al., "Performance Enhancement of a Slotted Waveguide Antenna by Utilizing Parasitic Elements", Sep. 7, 2015, pp. 1303-1306.
Gray, et al., "Carbon Fibre Reinforced Plastic Slotted Waveguide Antenna", Proceedings of Asia-Pacific Microwave Conference 2010, pp. 307-310.
Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Jankovic, et al., "Stepped Bend Substrate Integrated Waveguide to Rectangular Waveguide Transitions", Jun. 2016, 2 pages.
Li, et al., "Millimetre-wave slotted array antenna based on double-layer substrate integrated waveguide", Jun. 1, 2015, pp. 882-888.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Ogiwara, et al., "2-D MoM Analysis of the Choke Structure for Isolation Improvement between Two Waveguide Slot Array Antennas", Proceedings of Asia-Pacific Microwave Conference 2007, 4 pages.
Razmhosseini, et al., "Parasitic Slot Elements for Bandwidth Enhancement of Slotted Waveguide Antennas", 2019 IEEE 90th Vehicular Technology Conference, Sep. 2019, 5 pages.
Rossello, et al., "Substrate Integrated Waveguide Aperture Coupled Patch Antenna Array for 24 GHz Wireless Backhaul and Radar Applications", Nov. 16, 2014, 2 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Shehab, et al., "Substrate-Integrated-Waveguide Power Dividers", Oct. 15, 2019, pp. 27-38.
Wang, et al., "Mechanical and Dielectric Strength of Laminated Epoxy Dielectric Graded Materials", Mar. 2020, 15 pages.
Wu, et al., "A Planar W-Band Large-Scale High-Gain Substrate-Integrated Waveguide Slot Array", Feb. 3, 2020, pp. 6429-6434.
Xu, et al., "CPW Center-Fed Single-Layer SIW Slot Antenna Array for Automotive Radars", Jun. 12, 2014, pp. 4528-4536.
"Extended European Search Report", EP Application No. 20155296.5, Jul. 13, 2020, 12 pages.
"Extended European Search Report", EP Application No. 21211474.8, Apr. 20, 2022, 14 pages.
"Extended European Search Report", EP Application No. 21215901.6, Jun. 9, 2022, 8 pages.
"Extended European Search Report", EP Application No. 21216319.0, Jun. 10, 2022, 12 pages.

(56) References Cited

OTHER PUBLICATIONS

"Extended European Search Report", EP Application No. 22166998.9, Sep. 9, 2022, 12 pages.
"Extended European Search Report", EP Application No. 22183888.1, Dec. 20, 2022, 10 pages.
"Extended European Search Report", EP Application No. 22183892.3, Dec. 2, 2022, 8 pages.
"Extended European Search Report", EP Application No. 22184924.3, Dec. 2, 2022, 13 pages.
"Foreign Office Action", CN Application No. 202010146513.9, Feb. 7, 2022, 14 pages.
Adams, et al., "Dual Band Frequency Scanned, Height Finder Antenna", 1991 21st European Microwave Conference, 1991, 6 pages.
Bauer, et al., "A wideband transition from substrate integrated waveguide to differential microstrip lines in multilayer substrates", Sep. 2010, pp. 811-813.
Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.
Deutschmann, et al., "A Full W-Band Waveguide-to-Differential Microstrip Transition", Jun. 2019, pp. 335-338.
Furtula, et al., "Waveguide Bandpass Filters for Millimeter-Wave Radiometers", Journal of Infrared, Millimeter and Terahertz Waves, 2013, 9 pages.
Giese, et al., "Compact Wideband Single-ended and Differential Microstrip-to-waveguide Transitions at W-band", Jul. 2015, 4 pages.
Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.
Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.
Hausman, "Termination Insensitive Mixers", 2011 IEEE International Conference on Microwaves, Communications, Antennas and Electronic Systems (COMCAS 2011), Nov. 7, 2011, 13 pages.
Lin, et al., "A THz Waveguide Bandpass Filter Design Using an Artificial Neural Network", Micromachines 13(6), May 2022, 11 pages.
Serrano, et al., "Lowpass Filter Design for Space Applications in Waveguide Technology Using Alternative Topologies", Jan. 2013, 117 pages.
Tong, et al., "A Wide Band Transition from Waveguide to Differential Microstrip Lines", Dec. 2008, 5 pages.
Wang, et al., "A 79-GHz LTCC differential microstrip line to laminated waveguide transition using high permittivity material", Dec. 2010, pp. 1593-1596.
Wang, et al., "Low-loss frequency scanning planar array with hybrid feeding structure for low-altitude detection radar", Sep. 13, 2019, pp. 6708-6711.
Wu, et al., "The Substrate Integrated Circuits—A New Concept for High-Frequency Electronics and Optoelectronics", Dec. 2003, 8 pages.
Yu, et al., "Optimization and Implementation of SIW Slot Array for Both Medium- and Long-Range 77 GHz Automotive Radar Application", IEEE Transactions on Antennas and Propagation, vol. 66, No. 7, Jul. 2018, pp. 3769-3774.
Yuasa, et al., "A millimeter wave wideband differential line to waveguide transition using short ended slot line", Oct. 2014, pp. 1004-1007.
"Extended European Search Report", EP Application No. 23158037.4, Aug. 17, 2023, 9 pages.
"Extended European Search Report", EP Application No. 23158947.4, Aug. 17, 2023, 11 pages.
"Foreign Office Action", CN Application No. 202111550163.3, Jun. 17, 2023, 25 pages.
"Foreign Office Action", CN Application No. 202111550448.7, Jun. 17, 2023, 19 pages.
"Foreign Office Action", CN Application No. 202111551711.4, Jun. 17, 2023, 29 pages.
"Foreign Office Action", CN Application No. 202111551878.0, Jun. 15, 2023, 20 pages.
"Foreign Office Action", CN Application No. 202111563233.9, May 31, 2023, 15 pages.
"Foreign Office Action", CN Application No. 202111652507.1, Jun. 26, 2023, 14 pages.
"Foreign Office Action", CN Application No. 202210251362.2, Jun. 28, 2023, 15 pages.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.
Hausman, et al., "Termination Insensitive Mixers", 2011 IEEE International Conference on Microwaves, Communications, Antennas and Electronic Systems (COMCAS 2011), Dec. 19, 2011, 13 pages.
"Extended European Search Report", EP Application No. 23158946.6, Sep. 25, 2023, 10 pages.
Aulia Dewantari et al., "Flared SIW antenna design and transceiving experiments for W-band SAR", International Journal of RF and Microwave Computer-Aided Engineering, Wiley Interscience, Hoboken, USA, vol. 28, No. 9, May 9, 2018, XP072009558.

\* cited by examiner

WAVEGUIDE WITH SLOT ANTENNAS AND REFLECTORS

CROSS-REFERENCE TO RELATED APPLICATION

This application claims the benefit under 35 U.S.C. 119 (e) of U.S. Provisional Application No. 63/363,997, filed May 2, 2022, the disclosure of which is hereby incorporated by reference in their entirety herein.

BACKGROUND

Some devices (e.g., radar systems) use electromagnetic signals to detect and track objects. The electromagnetic signals are transmitted and received using one or more antennas. The radiation pattern of an antenna may be characterized by gain or beamwidth, which indicates gain as a function of direction. Precisely controlling the radiation pattern can improve the application of a radar system. For example, many automotive applications require radar systems that provide a wide beamwidth to detect objects within a particular field of view (e.g., in a travel path of the vehicle). Other automotive applications require an asymmetrical beamwidth to detect objects within a different field of view.

A waveguide may be used to improve and control the radiation pattern of either type of device. Such waveguides can include perforations or radiating slots to guide radiation near the antenna due to their ease of design and relatively wide field of view. These slot antennas often require large ground plans to achieve a wide field of view. In the absence of a large ground plane, slot antennas can have a smaller field of view with ripples in the radiation pattern. In addition, arrays of slot antennas are susceptible to coupling among adjacent antenna elements and edge firing that negatively impacts phase monotonicity.

SUMMARY

This document describes techniques, apparatuses, and systems for a waveguide with slot antennas and reflectors. An apparatus may include a waveguide channel that includes a hollow channel containing a dielectric and an array of slot antennas through a surface that is operably connected with the dielectric. The apparatus also includes reflectors positioned adjacent to and offset from each longitudinal side of the waveguide channel. The reflectors and the waveguide channel are positioned to generate a particular radiation pattern for an antenna element electrically coupled to the dielectric. In this way, the described waveguide with slot antennas and reflectors can adjust the positioning of the reflectors to provide a radiation pattern with a wide or asymmetric beamwidth.

This document also describes methods performed by the above-summarized techniques, apparatuses, and systems, and other methods set forth herein, as well as means for performing these methods.

This Summary introduces simplified concepts related to a waveguide with slot antennas and reflectors, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a waveguide with slot antennas and reflectors are described in this document with reference to the following figures. The same numbers are often used throughout the drawings to reference like features and components.

DETAILED DESCRIPTION

Overview

Radar systems are a sensing technology that some automotive systems rely on to acquire information about the surrounding environment. Radar systems generally use an antenna to direct electromagnetic energy or signals being transmitted or received. Such radar systems can use multiple antenna elements (e.g., slot antennas) in an array to provide increased gain and directivity in comparison to the radiation pattern achievable with a single antenna element. Signals from the multiple antenna elements are combined with appropriate phases and weighted amplitudes to provide the desired radiation pattern.

Consider a waveguide used to transfer electromagnetic energy to and from the antenna elements. The waveguide generally includes an array of radiation slots (e.g., slot antennas) representing apertures in the waveguide. Manufacturers may select the number and arrangement of the slot antennas to provide the desired phasing, combining, or splitting of electromagnetic energy. For example, the slot antennas are equally spaced in a waveguide surface along a propagation direction of the electromagnetic energy.

This document describes a waveguide with slot antennas and reflectors that provides a wide or asymmetric radiation pattern in the azimuth plane. The waveguide includes reflectors on both sides of the waveguide channel to provide the desired radiation pattern. The reflectors are positioned offset from the waveguide channel to influence the radiation pattern. The reflectors can be sized and positioned relative to the array of radiation slots to generate a radiation pattern with a wide beamwidth or asymmetrical radiation pattern to obtain desired characteristics. The reflectors can also provide better isolation among multiple waveguides.

The described waveguide with slot antennas and reflectors may be particularly advantageous for use in an automotive context, for example, detecting objects in a roadway in a travel path of a vehicle. The wide beamwidth allows a radar system of the vehicle to detect objects in a larger field of view. As one example, a radar system placed near the front of a vehicle can use a wide beamwidth to focus on detecting objects in front of the vehicle.

This example waveguide is just one example of the described techniques, apparatuses, and systems of a waveguide with slot antennas and reflectors. This document describes other examples and implementations.

Operating Environment

Figure 1:
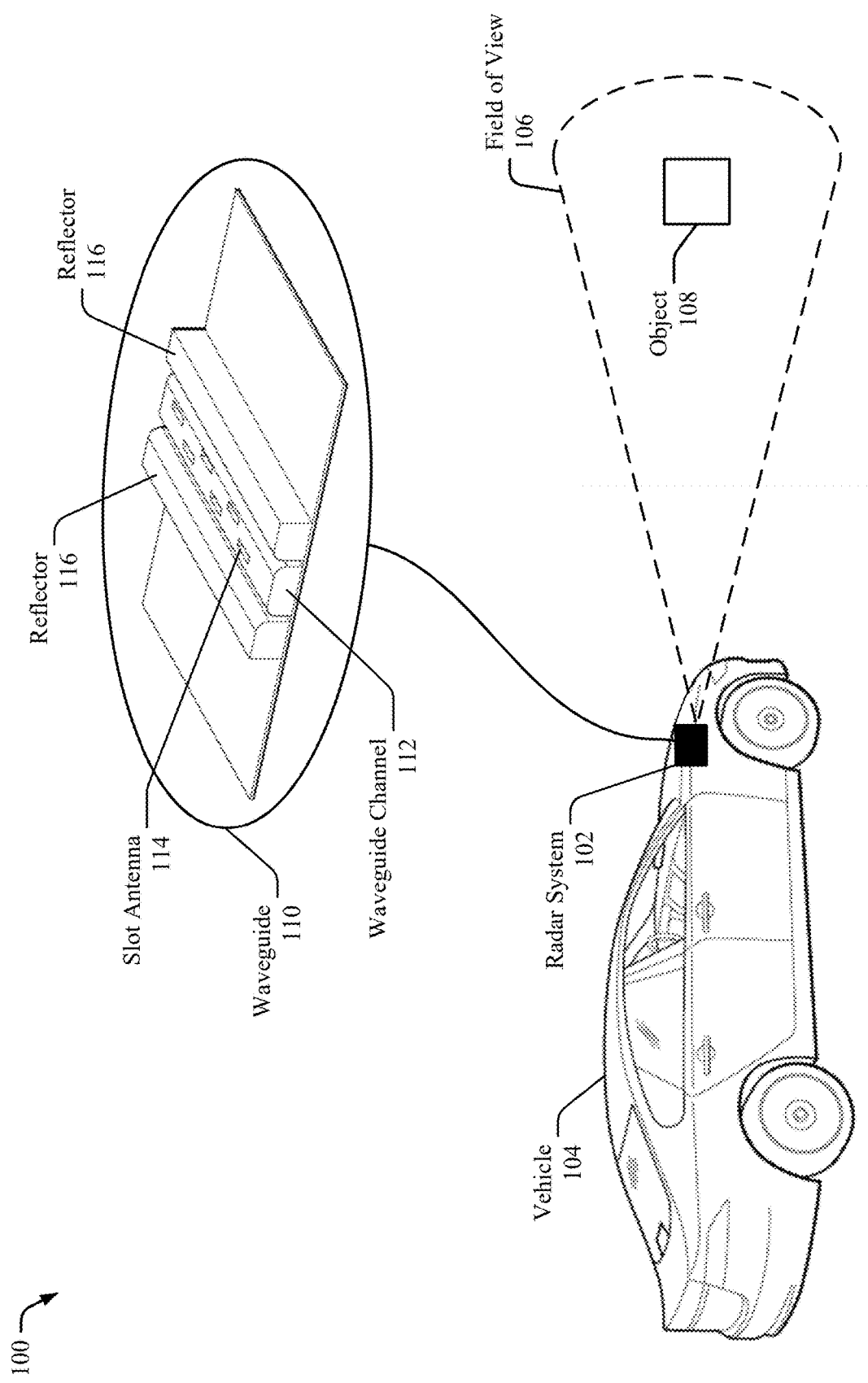
FIG. 1 illustrates an example environment in which a radar system with a waveguide with slot antennas and reflectors assembly is used on a vehicle.

FIG. 1 illustrates an example environment 100 in which a radar system 102 with a waveguide 110 with slot antennas 114 and reflectors 116 is used on a vehicle 104. The vehicle 104 may use the waveguide 110 to enable operations of the radar system 102 which is configured to determine the proximity, an angle, or a velocity of one or more objects 108 in the proximity of the vehicle 104.

Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the waveguide 110 and support techniques described herein.

In the depicted environment 100, the radar system 102 is mounted near or integrated within a front portion of the vehicle 104 to detect the object 108 and avoid collisions. The radar system 102 provides a field of view 106 towards the one or more objects 108. The radar system 102 can project the field of view 106 from any exterior surface of the vehicle 104. For example, vehicle manufacturers can integrate the radar system 102 into a bumper, side mirror, headlights, rear lights, or any other interior or exterior location where the object 108 requires detection. In some cases, the vehicle 104 includes multiple radar systems 102, such as a first radar system 102 and a second radar system 102 that provide a larger field of view 106. In general, vehicle manufacturers can design the locations of the one or more radar systems 102 to provide a particular field of view 106 that encompasses a region of interest, including, for instance, in or around a travel lane aligned with a vehicle path.

Example fields of view 106 include a 360-degree field of view, one or more 180-degree fields of view, one or more 90-degree fields of view, and so forth, which can overlap or be combined into a field of view 106 of a particular size. As described above, the described waveguide 110 includes the reflectors 116 to provide a radiation pattern with a wider coverage or asymmetry in the azimuth plane or the elevation plane. As one example, a radar system 102 placed near the front of the vehicle 104 can use a wider beamwidth to focus on detecting objects in front of the vehicle (e.g., in a travel lane aligned with a vehicle path). For example, the wider coverage or wider beamwidth can better detect objects in the travel path of the vehicle 104. In contrast, a waveguide without the described configuration of reflectors 116 may provide a relatively narrow radiation pattern that may fail to detect objects offset from the travel path of the vehicle 104.

As another example, a radar system 102 placed near the front corner (e.g., the front left corner) of a vehicle 104 can use an asymmetrical radiation pattern in one plane to focus on detecting objects immediately in front of the vehicle 104 (e.g., in the left-hand portion of a travel lane aligned with a vehicle path) instead of objects located toward a side of the vehicle 104 (e.g., in an adjacent travel lane to the vehicle path). For example, the asymmetrical coverage or asymmetrical beamwidth can concentrate the radiated EM energy within 30 to 90 degrees of a direction following a travel path of the vehicle 104. In contrast, a waveguide without the described configuration of reflectors 116 may provide a relatively uniform radiation pattern with the radiated EM energy within plus or minus approximately 90 degrees of the travel-path direction.

The object 108 is composed of one or more materials that reflect radar signals. Depending on the application, the object 108 can represent a target of interest. In some cases, the object 108 can be a moving object or a stationary object. The stationary objects can be continuous (e.g., a concrete barrier, a guard rail) or discontinuous (e.g., a traffic cone) along a road portion.

The radar system 102 emits electromagnetic radiation by transmitting one or more electromagnetic signals or waveforms via the slot antennas 114 and the reflectors 116. In the environment 100, the radar system 102 can detect and track the object 108 by transmitting and receiving one or more radar signals. For example, the radar system 102 can transmit electromagnetic signals between 100 and 400 gigahertz (GHz), between 4 and 100 GHz, or between approximately 70 and 80 GHz.

The radar system 102 can determine a distance to the object 108 based on the time it takes for the signals to travel from the radar system 102 to the object 108 and from the object 108 back to the radar system 102. The radar system 102 can also determine the location of the object 108 in terms of an angle based on the direction of a maximum amplitude echo signal received by the radar system 102.

The radar system 102 can be part of the vehicle 104. The vehicle 104 can also include at least one automotive system that relies on data from the radar system 102, including a driver-assistance system, an autonomous-driving system, or a semi-autonomous-driving system. The radar system 102 can include an interface to the automotive systems. The radar system 102 can output, via the interface, a signal based on electromagnetic energy received by the radar system 102.

Generally, the automotive systems use radar data provided by the radar system 102 to perform a function. For example, the driver-assistance system can provide blind-spot monitoring and generate an alert indicating a potential collision with the object 108 detected by the radar system 102. In this case, the radar data from the radar system 102 indicates when it is safe or unsafe to change lanes. The autonomous-driving system may move the vehicle 104 to a particular location on the road while avoiding collisions with the object 108 detected by the radar system 102. The radar data provided by the radar system 102 can provide information about the distance to and the location of the object 108 to enable the autonomous-driving system to perform emergency braking, perform a lane change, or adjust the speed of the vehicle 104.

The radar system 102 generally includes a transmitter (not illustrated) and at least one antenna, including the waveguide 110, to transmit electromagnetic signals. The radar system 102 generally includes a receiver (not illustrated) and at least one antenna, including the waveguide 110, to receive reflected versions of these electromagnetic signals. The transmitter includes components for emitting electromagnetic signals. The receiver includes components to detect the reflected electromagnetic signals. The transmitter and the receiver can be incorporated together on the same integrated circuit (e.g., a transceiver integrated circuit) or separately on different integrated circuits.

The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process electromagnetic energy received by the antenna and determine the location of the object 108 relative to the radar system 102. The processor can also generate radar data for automotive systems. For example, the processor can control, based on processed electromagnetic energy from the antenna, an autonomous or semi-autonomous driving system of the vehicle 104.

The waveguide 110 includes at least one layer that can be any solid material, including wood, carbon fiber, fiberglass, metal, plastic, or a combination thereof. The waveguide 110 can also include a printed circuit board (PCB). The waveguide 110 is designed to mechanically support components (e.g., a waveguide channel 112, slot antennas 114 in the waveguide channel 112, reflectors 116) to a dielectric using conductive materials. The waveguide channel 112 includes a hollow channel to contain the dielectric (e.g., air). The slot antennas 114 provide an opening through a layer or surface of the waveguide channel 112. The slot antennas 114 are configured to allow electromagnetic energy to dissipate to the environment 100 from the dielectric in the waveguide channel 112.

The reflectors 116 are formed on the surface of the waveguide 110 and to the side of the waveguide channel 112. The reflectors are not parasitic elements to individual slot antennas 114 but instead function as parasitic elements to the waveguide channel 112. As a result, the reflectors 116 are not required to be part of the same component as the waveguide channel 112 and can be separated a small distance from the waveguide channel 112 and the slot antennas 114. Because the reflectors 116 are not part of the ground plane of the waveguide 110, the reflectors 116 can be attached in any manner if they are made of reflective material. The reflectors 116 function as secondary radiating elements for the electromagnetic energy dissipating through the slot antennas 114 and do not require an electrical connection to the ground structure of the waveguide channel 112 and slot antennas 114. The overall far-field radiation pattern of the waveguide 110 is shaped by the near-field radiation pattern of the waveguide channel 112 (with the slot antennas 114) and the two reflectors 116.

This document describes example embodiments of the waveguide 110 to provide wide or asymmetric coverage in an antenna radiation pattern in greater detail with respect to FIGS. 2 through 10.

Figure 2:
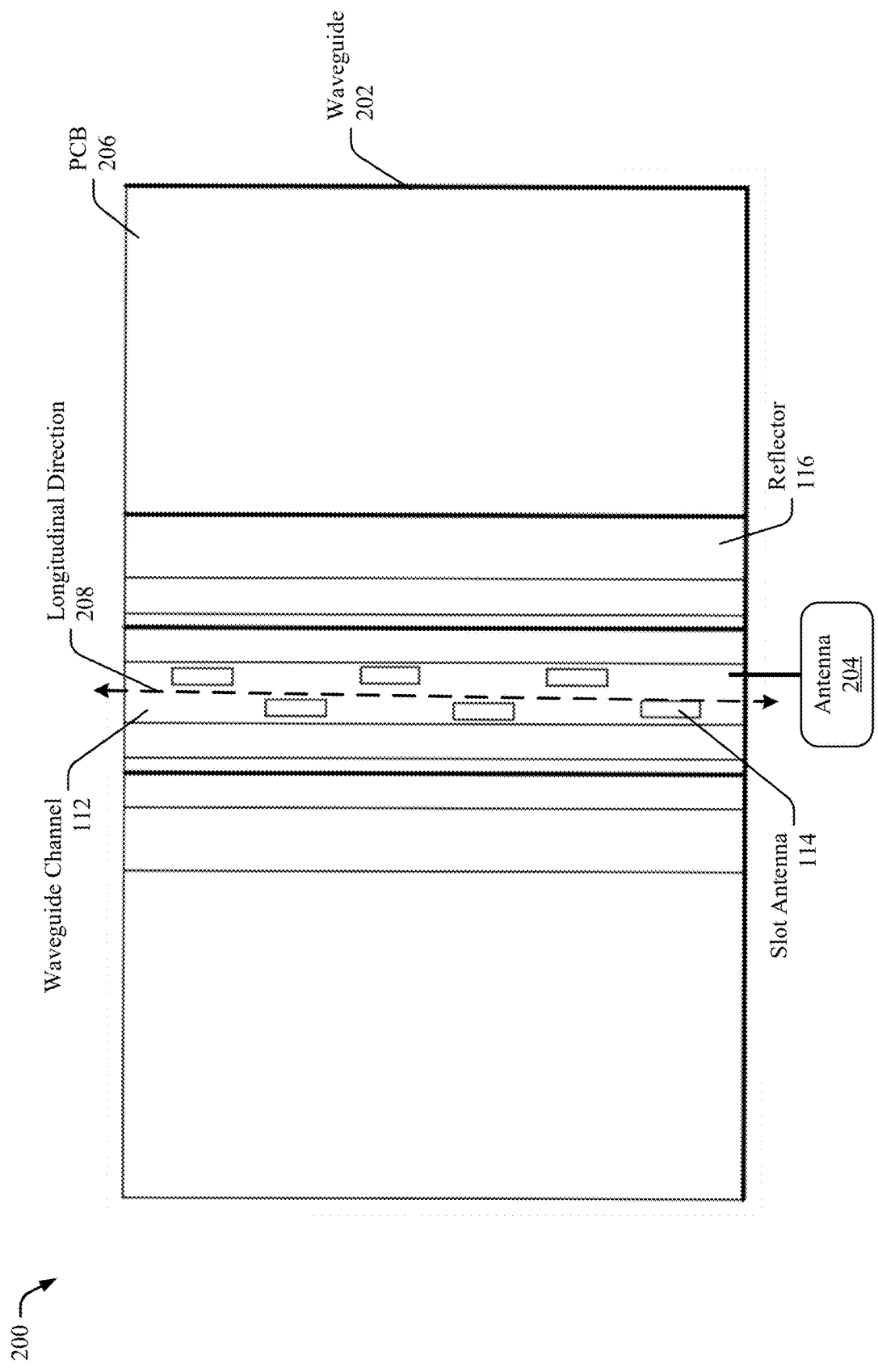
FIG. 2 illustrates a top view of a waveguide with slot antennas and reflectors.
Figure 3:
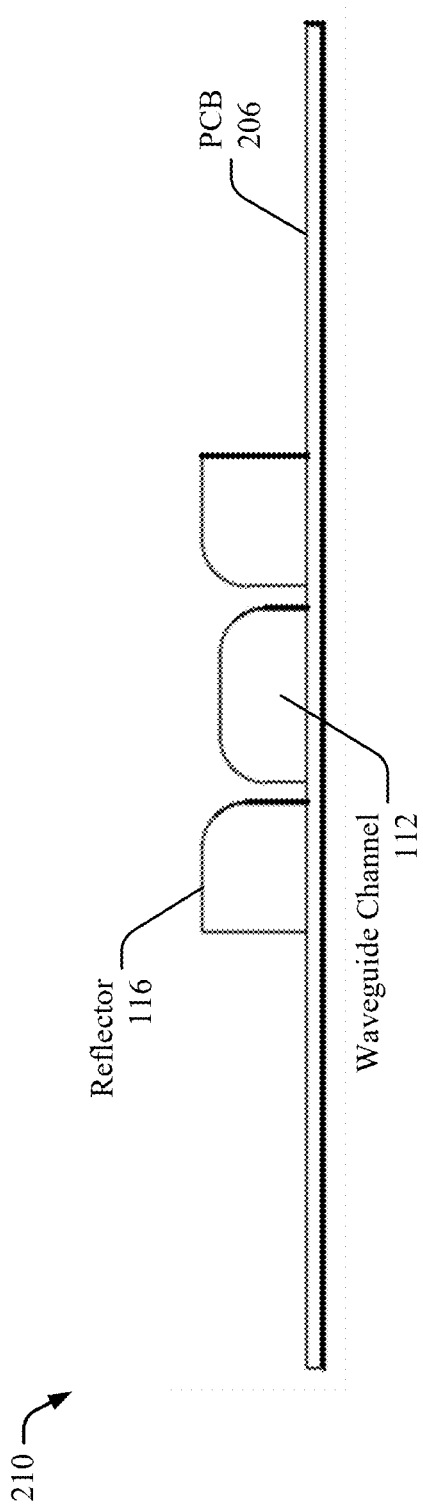
FIG. 3 illustrates a side view of a waveguide with slot antennas and reflectors.

FIG. 2 illustrates a top view 200 of a waveguide 202 with slot antennas 114 and reflectors 116. The waveguide 202 is an example of the waveguide 110 of FIG. 1. A side view 210 of the waveguide 202 is illustrated in FIG. 3. The waveguide 202 includes the waveguide channel 112, multiple slot antennas 114, and two reflectors 116.

The waveguide channel 112 is configured to channel electromagnetic signals transmitted by the transmitter and an antenna 204. The antenna 204 can be electrically coupled to a floor of the waveguide channel 112. The floor of the waveguide channel 112 is a first layer or surface of a printed circuit board (PCB) 206, on which the waveguide channel 112 and the reflectors 116 are positioned.

The waveguide channel 112 can include a hollow channel for a dielectric. The dielectric generally includes air, and the waveguide 202 is an air waveguide. The waveguide channel 112 includes a feed point at one end of the waveguide 202 in a longitudinal direction 208. The antenna 204 is electrically coupled to the dielectric via the floor of the waveguide channel 112. Electromagnetic signals enter the waveguide channel 112 through the feed point and exit the waveguide channel 112 via the slot antennas 114. In FIG. 2, the waveguide channel 112 forms an approximately rectangular shape in the longitudinal direction 208.

The slot antennas 114 provide an opening in a surface (e.g., a top surface) of the waveguide channel 112. For example, the slot antennas 114 can have an approximately rectangular shape (e.g., a longitudinal slot parallel to the longitudinal direction 208) as illustrated in FIG. 2. The longitudinal slots allow the slot antennas 114, in combination with the reflectors 116, to produce a horizontal-polarized radiation pattern. The slot antennas 114 can have other shapes in other implementations, including approximately circular, oval, or square.

The slot antennas 114 are sized and positioned in the waveguide channel 112 to produce a particular radiation pattern for the antenna 204. For example, at least some of the slot antennas 114 are offset from the longitudinal direction 208 (e.g., a centerline of the waveguide channel 112) by varying or non-uniform distances (e.g., in a zigzag shape) to reduce or eliminate side lobes from the radiation pattern of the waveguide 202. As another example, the slot antennas 114 nearer the wall at the opposite end of the waveguide channel 112 can have a larger longitudinal opening than the slot antennas 114 nearer the opening of the waveguide channel 112. The specific size and position of the slot antennas 114 can be determined by building and optimizing a model of the waveguide 202 to produce the desired radiation pattern.

As illustrated in FIG. 2, the plurality of slot antennas 114 is evenly distributed along the waveguide channel 112 along the longitudinal direction 208. Each adjacent pair of slot antennas 114 are separated along the longitudinal direction 208 by a uniform distance to produce a particular radiation pattern. The uniform distance, which is generally less than one wavelength of the electromagnetic radiation, can prevent grating lobes in the radiation pattern.

The reflectors 116 are positioned on or attached to an outer surface of the PCB 206. The reflectors 116 have an approximately rectangular shape in the depicted implementation. The reflectors 116 can have an approximately square shape, T shape, or L shape in other implementations, depending on the orientation and positioning of one or more waveguide channels 112. In yet other implementations, the reflectors 116 can combine the described shapes.

Figure 5:
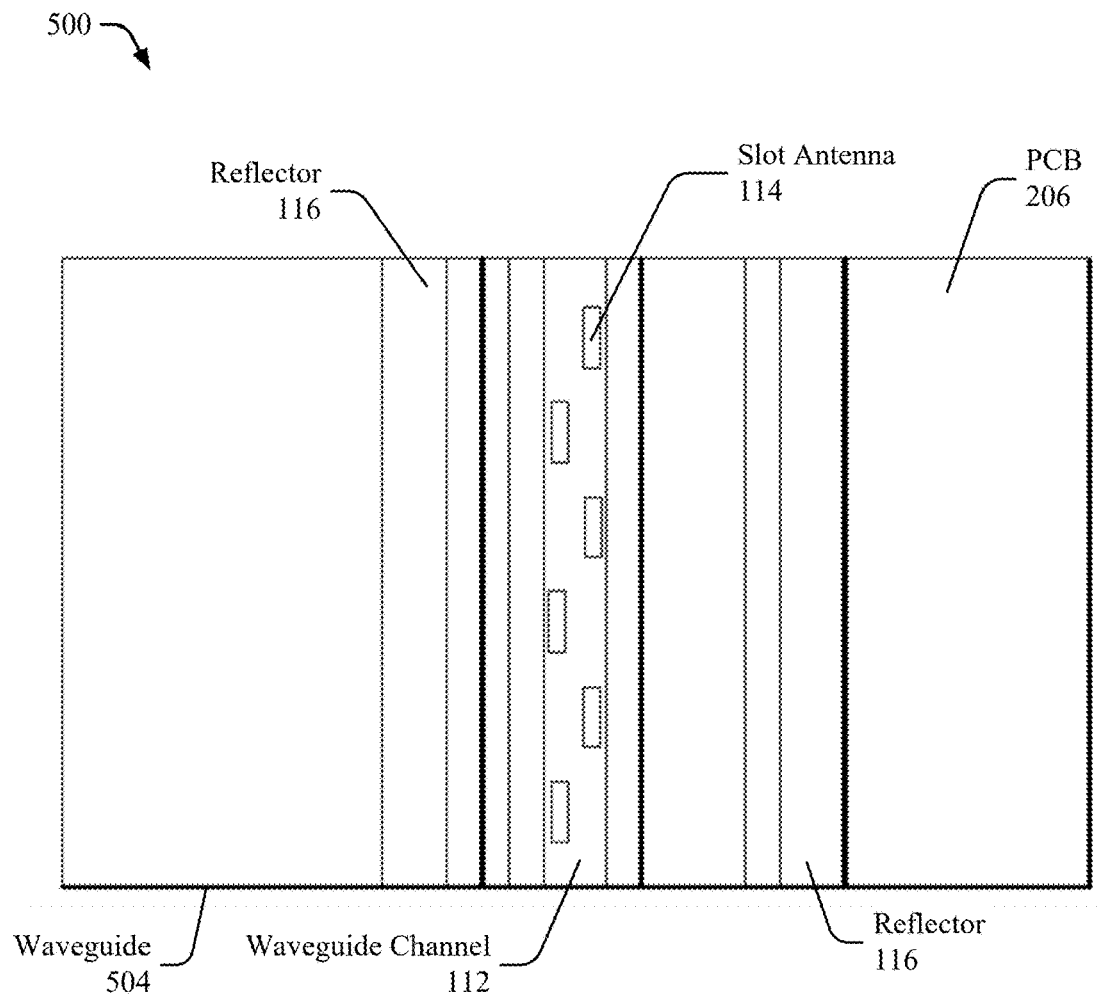
FIGS. 5 and 6 illustrate a top view and side view of a waveguide with slot antennas and asymmetrically spaced reflectors.
Figure 6:
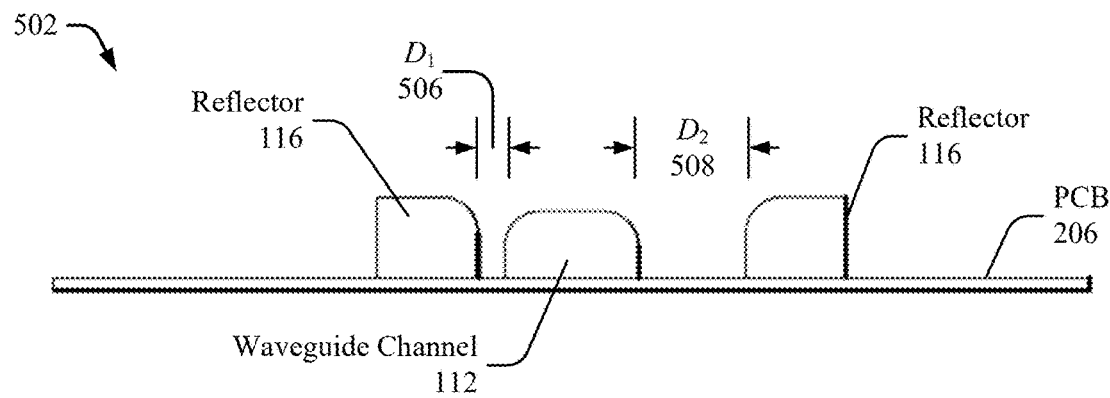

A reflector 116 is positioned adjacent to and offset from each longitudinal side of the slot antennas 114. The longitudinal sides of the reflectors 116 are approximately parallel to the longitudinal direction 208. The reflectors 116 are offset a uniform or equal distance (e.g., 2 millimeters) from the longitudinal sides of the waveguide channel 112 to generate a particular band of coverage in the radiation pattern of the antenna 204. In other implementations as illustrated in FIGS. 5 and 6, the reflectors can be offset different distances from the longitudinal sides of the waveguide channel 112 to generate an asymmetric radiation pattern.

The electromagnetic radiation that leaks through the slot antennas 114 may excite the reflectors 116 to generate a radiation pattern with a wide beamwidth in the azimuth plane. The shape and size of the reflectors 116 and their offset from the waveguide channel 112 can be configured to vary the bandwidth and characteristics of the radiation pattern. The specific size and position of the reflectors 116 can be determined by building and optimizing a model of the waveguide 202 to produce the desired radiation pattern.

FIG. 3 illustrates the side view 210 of the waveguide 202 with the slot antennas 114 and reflectors 116. The waveguide 202 includes the PCB 206, the waveguide channel 112, and the reflectors 116. The waveguide channel 112 and the reflectors 116 can be metal or metal-plated material. The slot antennas 114 form openings in the waveguide channel 112. The reflectors 116 are positioned on the PCB 206.

The waveguide channel 112 can form an approximately rectangular opening in the side view 210 of the waveguide 202. In other implementations, the waveguide channel 112 can form an approximately square, oval, or circular opening in the side view 210 of the waveguide 202.

In the depicted implementation, the reflectors 116 have a height (e.g., 1.7 millimeters) that is larger than the height (e.g., 1.2 millimeters) of the waveguide channel 112. In other implementations, the reflectors 116 can have a smaller height than the waveguide channel 112. For manufacturing ease, the reflectors 116 generally have the same height. In other implementations, the reflectors 116 can have different heights.

A width of the reflectors 116 is generally uniform (e.g., 2 millimeters). In other implementations, the width of the reflectors 116 can be different based on the number of and relative placement of an array of waveguide channels 112. The width of the reflectors 116 can be designed to optimize the radiation pattern of the antenna 204; in particular, the width of the reflectors 116 can affect the tails of the radiation pattern.

Figure 4:
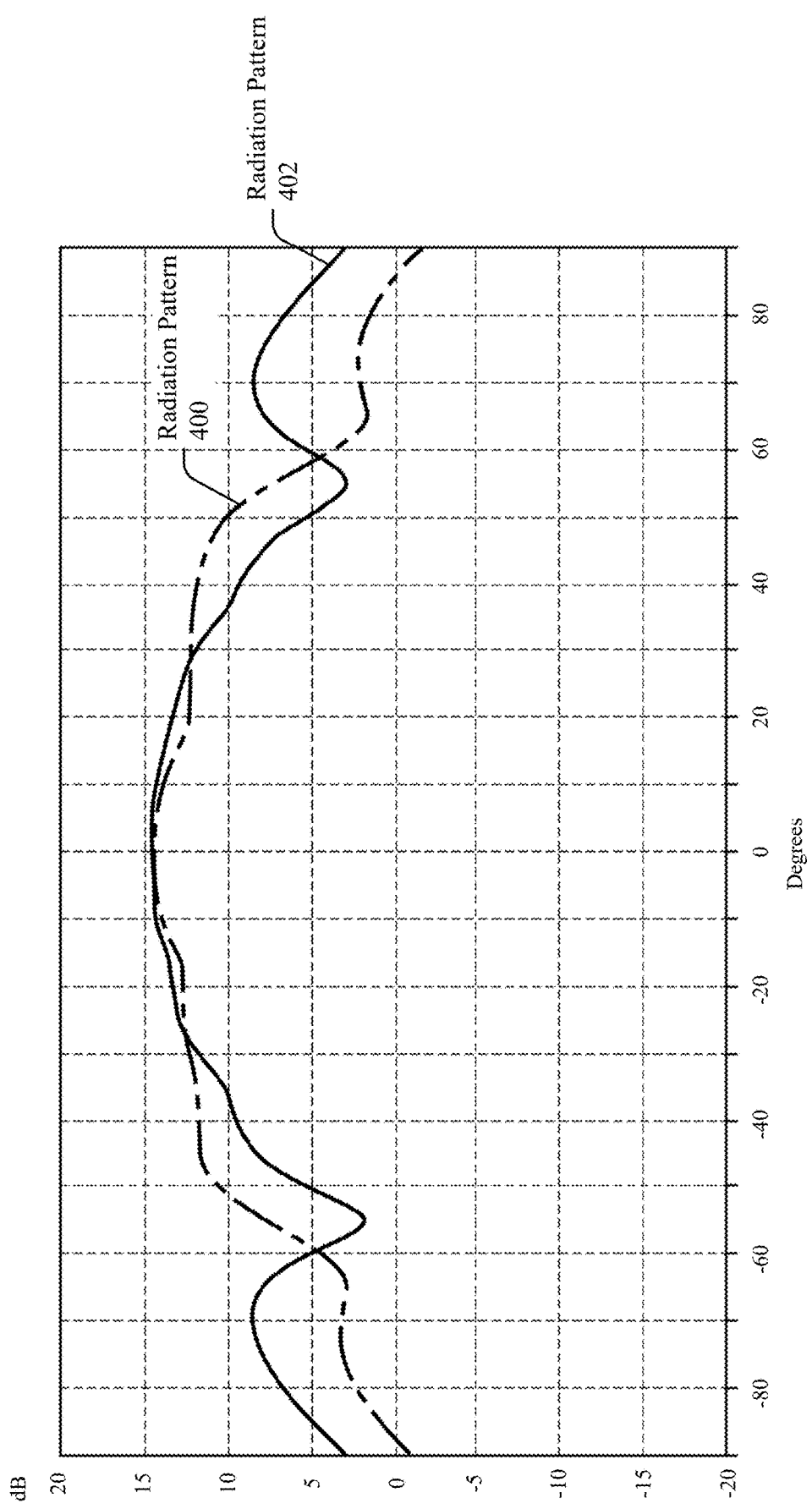
FIG. 4 illustrates example radiation patterns associated with a waveguide without and with reflectors.

FIG. 4 illustrates radiation patterns 400 and 402 associated with an example waveguide with and without the reflectors 116, respectively. The example waveguide with the reflectors 116 can be the waveguide 202 of FIGS. 2 and 3. The radiation patterns 400 and 402 are associated with an azimuth direction of the example waveguide. In other implementations, the radiation patterns 400 and 402 can be associated with an elevation direction depending on the orientation of the waveguide.

In the azimuth direction, the example waveguide without the reflectors 116 generates the radiation pattern 402 with a relatively large gain roll-off around plus and minus forty degrees. In contrast, the radiation pattern 400 illustrates that the example waveguide with the reflectors 116 pushes the gain roll-off out to about plus and minus fifty degrees and provides a uniform gain within this beamwidth (e.g., between negative fifty degrees and positive fifty degrees). In this way, the example waveguide with the reflectors 116 provides a larger field of view.

FIGS. 5 and 6 illustrate a top view 500 and side view 502, respectively, of a waveguide 504 with slot antennas 114 and reflectors 116. Like the waveguide 202 of FIGS. 2 and 3, the waveguide 504 includes the PCB 206, the waveguide channel 112 with the slot antennas 114, and the reflectors 116. In the depicted implementation, the reflectors 116 are spaced at different distances from longitudinal sides of the waveguide channel 112. For example, one reflector 116 is spaced a first distance ($D_1$) 506 from a longitudinal side of the waveguide channel 112 and the other reflector 116 is spaced a second distance ($D_2$) 508 from the other longitudinal side of the waveguide channel 112. The first distance 506 is generally at least three times the second distance 508 to provide an asymmetric radiation pattern.

In the depicted implementation, the reflectors 116 have a height (e.g., 1.7 millimeters) that is larger than the height (e.g., 1.2 millimeters) of the waveguide channel 112. In other implementations, the reflectors 116 can have a smaller height than the waveguide channel 112. For manufacturing ease, the reflectors 116 generally have the same height. In the depicted implementation, the waveguide channel 112 has a width of approximately 3.14 millimeters, the first distance 506 is approximately 0.65 millimeters, and the second distance 508 is approximately two millimeters. In other implementations, the width of the waveguide channel 112, the first distance 506, and the second distance 508 can have different values and are configurable based on a desired asymmetrical radiation pattern for the waveguide 504.

The electromagnetic radiation that leaks through the slot antennas 114 reflects off the reflectors 116 to generate an asymmetrical radiation pattern in the azimuth plane or elevation plane. The shape, size, and offset (e.g., the first distance 506 and the second distance 508) of the reflectors 116 can be configured to vary the bandwidth and characteristics of the radiation pattern. The specific size and position of the reflectors 116 can be determined by building and optimizing a model of the waveguide 504 to produce the desired radiation pattern.

The waveguide 504 can generate the asymmetrical radiation pattern in the azimuth plane or elevation plane to enable the radar system 102 to focus the radiation pattern of a corresponding antenna on a portion of the field of view 106 where potential objects 108 are more likely to be located than a radar system can using a more uniform radiation pattern. As one example, the radar system 102 placed near the front of the vehicle 104 with the asymmetrically spaced reflectors 116 can use an asymmetrical radiation pattern in one plane to focus on detecting objects 108 immediately in front of the vehicle 104 instead of objects located toward a side of the vehicle 104.

Figure 7A:
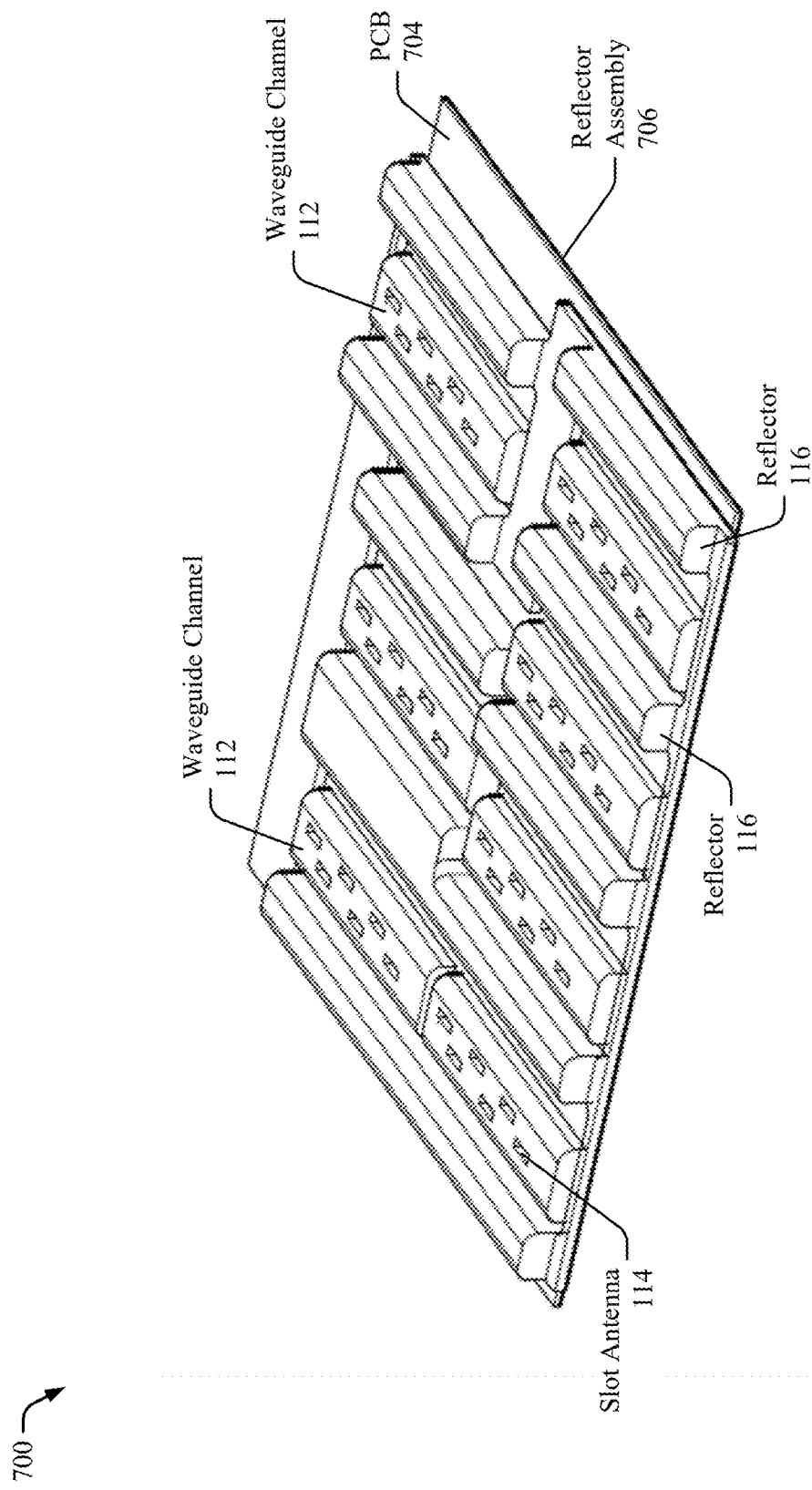
FIGS. 7A and 7B illustrate a perspective view and an exploded view of an example array of waveguides with slot antennas and reflectors.
Figure 7B:
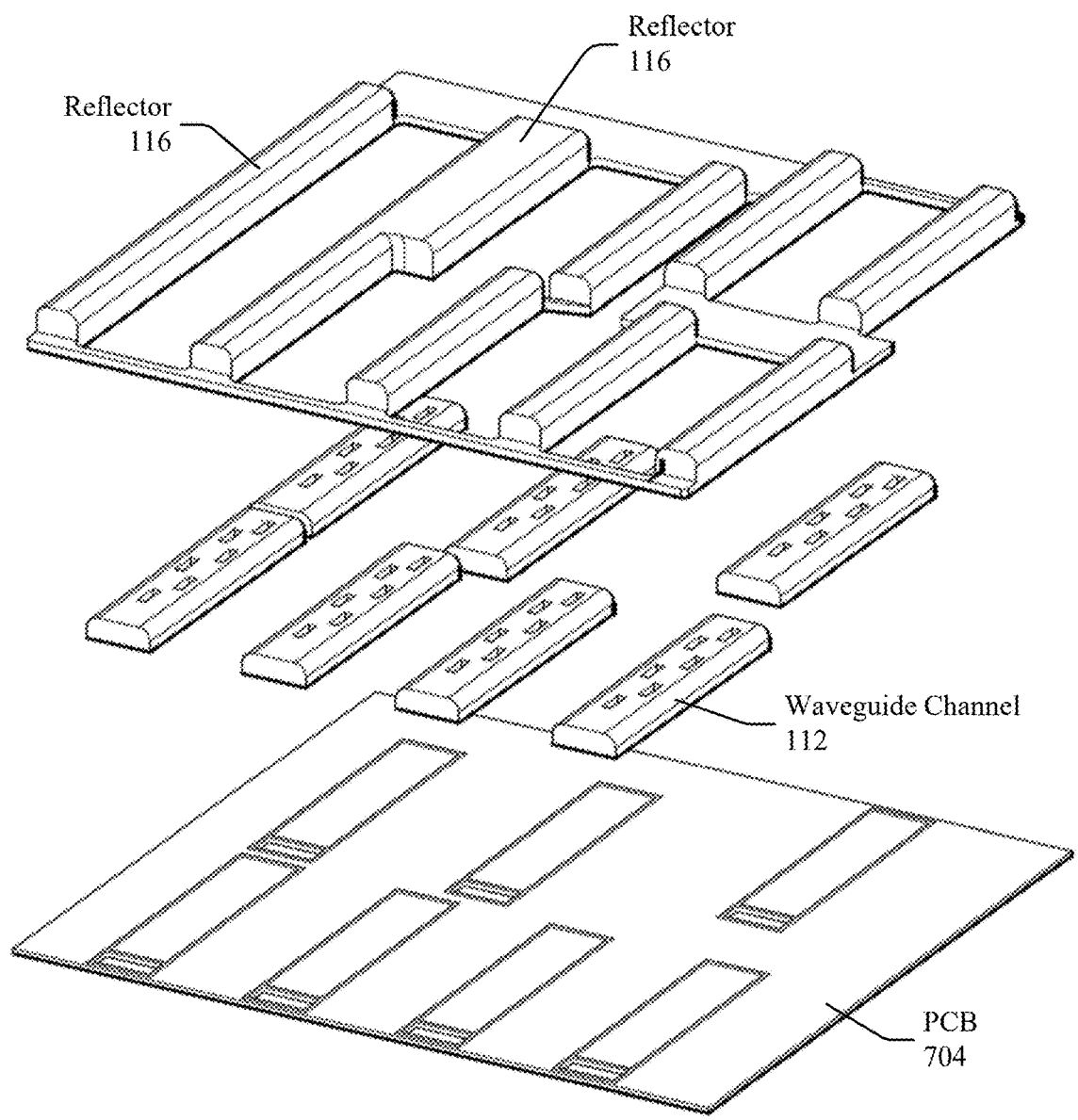

FIGS. 7A and 7B illustrate a perspective view 700 and an exploded view 702, respectively, of an example array of waveguides with slot antennas and reflectors. Like the waveguide 504 of FIGS. 5 and 6, the waveguides in the illustrated implementation include a PCB 704, the waveguide channels 112 with the slot antennas 114, and the reflectors 116. The reflectors 116 are spaced different distances from longitudinal sides of each waveguide channel 112 and collectively form a reflector assembly 706.

Each waveguide channel 112 can be manufactured using a stamping process on a thin, malleable sheet of metal. Similarly, a stamping process or a similar process can be used to form the slot antennas 114 in each waveguide channel 112. The waveguide channels 112 can be assembled onto the PCB 704 using a solder reflow process.

The reflector assembly 706 can be attached or held in place on top of the PCB 704 via ribs of a radome of the radar system 102 (not illustrated), screws, adhesive or any other attachment means. The reflector assembly 706 can be a single structure made up of any molded or three-dimensional printed material that has a high reflectivity for electromagnetic signals, including aluminum, plated plastic, or conductive plastic.

Figure 8:
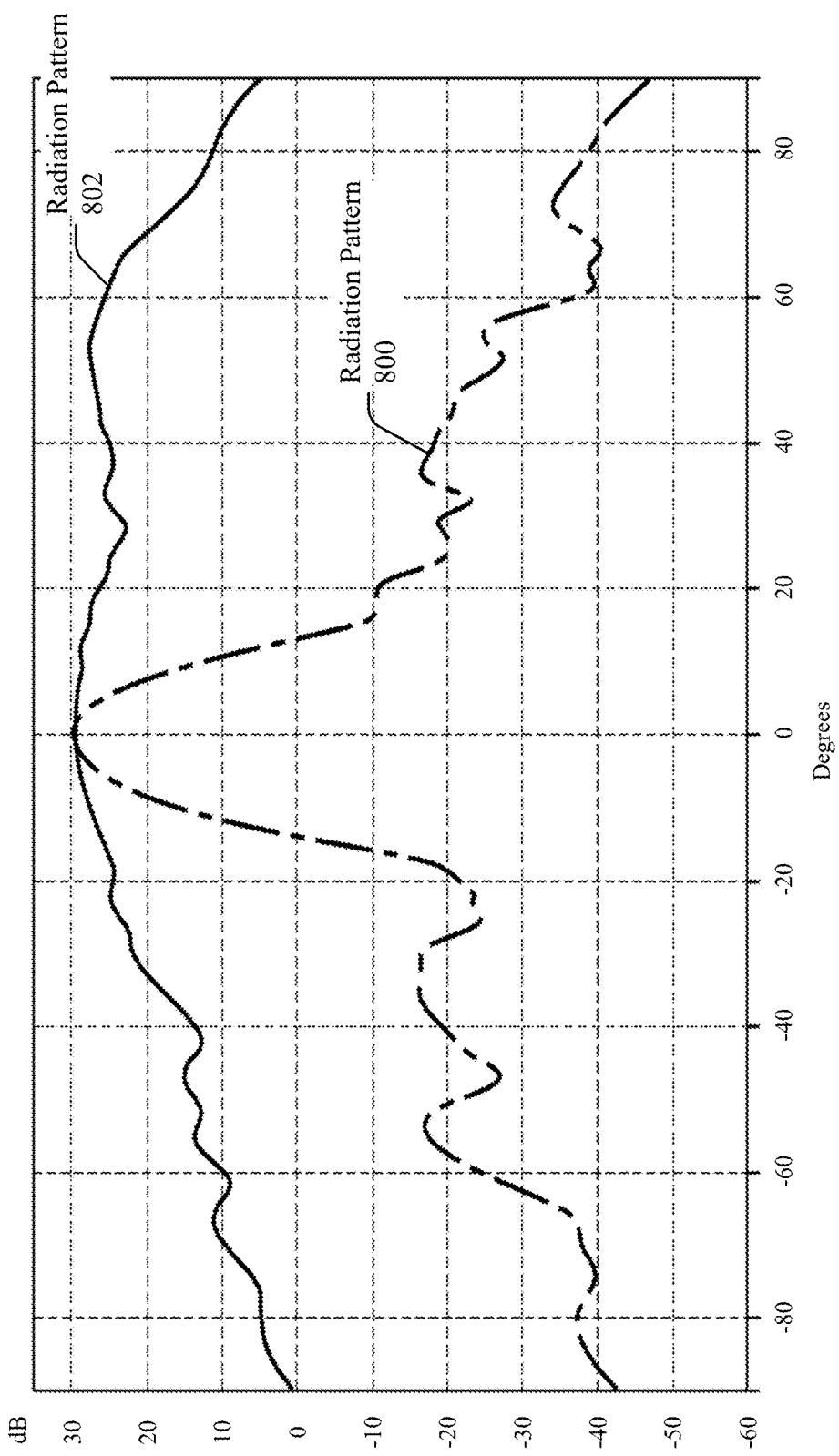
FIG. 8 illustrates example radiation patterns associated with an example array of waveguides with slot antennas and reflectors.

FIG. 8 illustrates example radiation patterns 800 and 802 associated with an example array of waveguides with slot antennas 114 and reflectors 116. The example array of waveguides can be the waveguides of FIGS. 7A and 7B with the reflectors 116 asymmetrically spaced from the waveguide channels 112. By asymmetrically spacing the reflectors 116 relative to the waveguide channels 112, a skew or tilt in the radiation pattern 802 in the azimuth plane is introduced, with the energy focused on a particular portion of the antenna radiation pattern. In contrast, the radiation pattern 800 in the elevation plane is relatively uniform with a narrow beamwidth. The waveguides can generate the asymmetrical radiation pattern 802 in the azimuth plane to enable a radar system to focus the radiation pattern of a corresponding antenna on a portion of the field of view where potential objects are more likely to be located. As one example, a radar system placed near the front of a vehicle can use an asymmetrical radiation pattern in one plane to focus on detecting objects immediately in front of the vehicle instead of objects located toward a side of the vehicle.

Figure 9A:
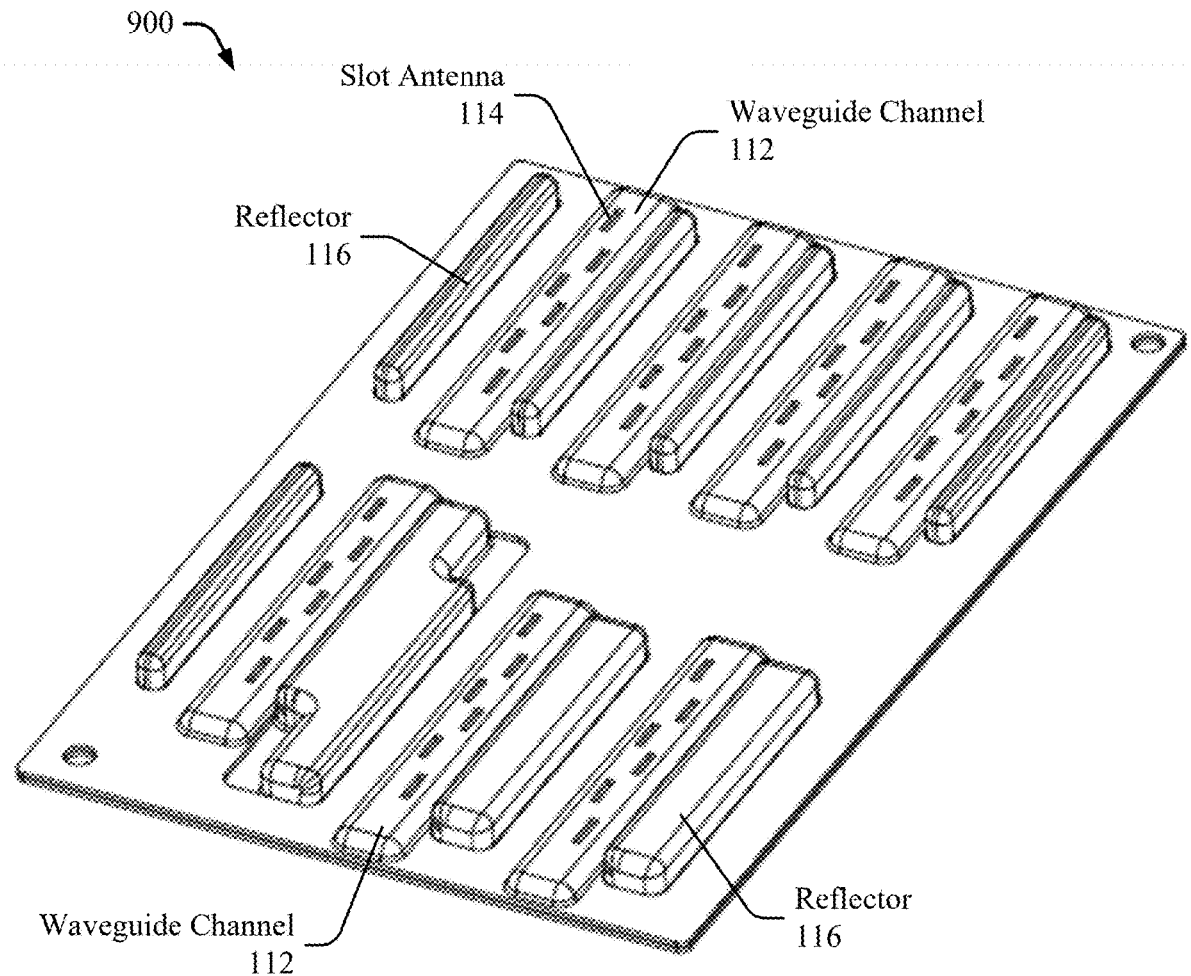
FIGS. 9A and 9B illustrate a perspective view and an exploded view of another example array of waveguides with slot antennas and reflectors.
Figure 9B:
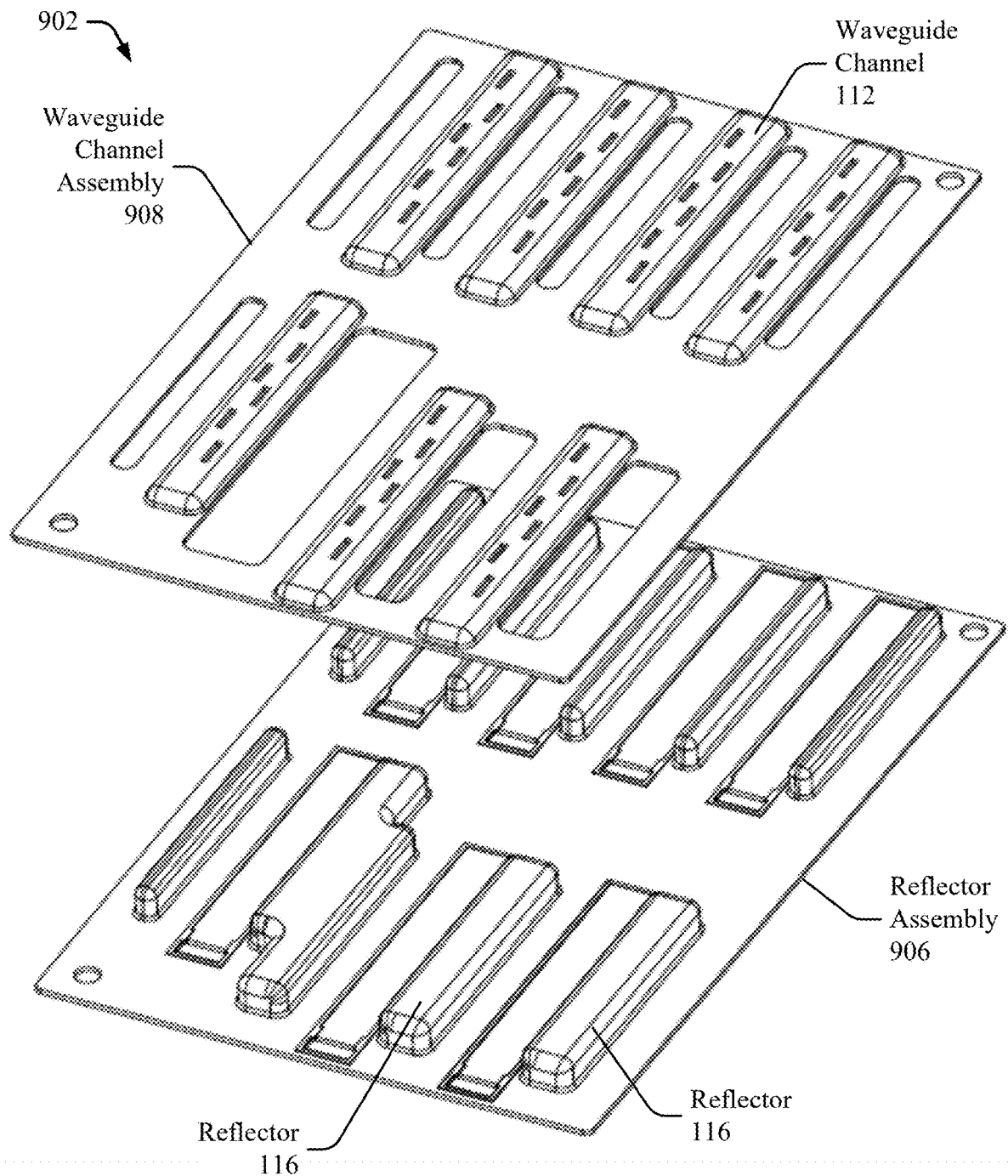

FIGS. 9A and 9B illustrate a perspective view 900 and an exploded view 902, respectively, of another example array of waveguides with slot antennas and reflectors. The waveguides in the illustrated implementation include a PCB (not illustrated), the waveguide channels 112 with the slot antennas 114, and the reflectors 116. The reflectors 116 are spaced at different distances from longitudinal sides of each waveguide channel 112 and collectively form a reflector assembly 906. The waveguide channels 112 collectively form a waveguide channel assembly 908.

Each of the reflector assembly 906 and the waveguide channel assembly 908 are a single structure to reduce manufacturing costs and simplify assembly. The reflector assembly 906 and the waveguide channel assembly 908 can be manufactured using hydroformed metal plates or sheets. The two metal plates can be joined together using a braising process, achieving electrical conductivity among the metal plates or sheets. The reflector assembly 906 and the waveguide channel assembly 908 can also be joined together using a conductive adhesive, dispense, or a similar technique.

Example Method

Figure 10:
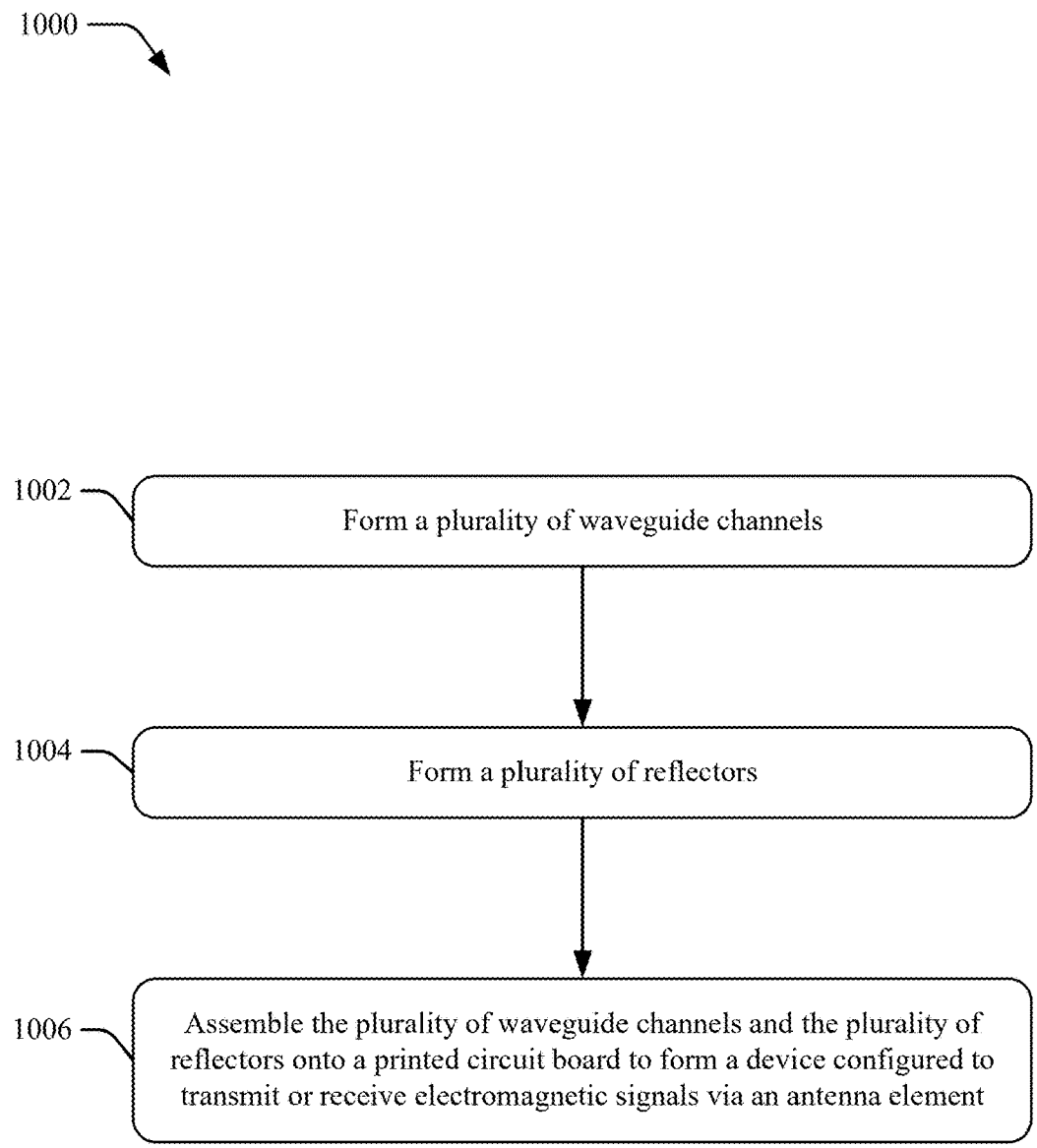
FIG. 10 illustrates an example method for manufacturing a waveguide with slot antennas and reflectors following techniques, apparatuses, and systems of this disclosure.

FIG. 10 illustrates an example method 1000 that can be used for manufacturing a waveguide with slot-fed dipole elements, following techniques, apparatuses, and systems of this disclosure. Method 1000 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 through 9B, reference to which is made for example only. The techniques are not limited to performance by one entity or multiple entities.

At 1002, a plurality of waveguide channels is formed. Each waveguide channel includes a hollow channel for a dielectric. The hollow channel includes a plurality of slot antennas with each slot antenna providing an opening through a surface of the waveguide channel that defines the hollow channel. Each of the slot antennas is also operably connected with the dielectric. The waveguide channels can be stamped, cut, machined, cast, molded, or formed in some other way. For example, each waveguide channel can be manufactured by applying a stamping process to a thin malleable sheet of metal. As another example, the waveguide channels can be formed using a hydroforming process on a metal plate.

At 1004, a plurality of reflectors is formed. The reflectors can be stamped, cut, machined, cast, molded, or formed in some other way. For example, the reflectors can be formed from a single piece of molded material (e.g., aluminum) or three-dimensionally printed material (e.g., plated plastic, conductive plastic) that reflects electromagnetic waves. As another example, the reflectors can be formed using a hydroforming process on a metal plate.

At 1006, the plurality of waveguide channels and the plurality of reflectors are assembled onto a PCB to form a device configured to transmit or receive electromagnetic signals via an antenna element. The plurality of reflectors is positioned adjacent to and offset from each longitudinal side of each waveguide channel. The plurality of reflectors and the plurality of waveguide channels are arranged to produce a particular radiation pattern for the antenna element that is electrically coupled to the dielectric from a floor of the hollow channel of each waveguide channel. The waveguide channels can be assembled onto the PCB using solder. The reflector assembly can be attached or held in place to the PCB using screws, adhesive, or a radome structure (e.g., via ribs of the radome structure).

EXAMPLES

In the following section, examples are provided.

Example 1. An apparatus comprising: a waveguide channel that includes a hollow channel for a dielectric, the hollow channel including a plurality of slot antennas, each of the slot antennas comprising an opening through a surface of the waveguide channel that defines the hollow channel, each of the slot antennas being operably connected with the dielectric; and two reflectors positioned adjacent to and offset from each longitudinal side of the waveguide channel, the reflectors and the waveguide channel being arranged to produce a particular radiation pattern for an antenna element that is electrically coupled to the dielectric.

Example 2. The apparatus of Example 1, wherein the two reflectors are not part of a ground plane of the waveguide channel.

Example 3. The apparatus of Example 1 or 2, wherein the two reflectors are offset an equal distance from each longitudinal side of the waveguide channel.

Example 4. The apparatus of any one of the preceding Examples, wherein: a first reflector of the two reflectors is offset a first distance from a first longitudinal side of the waveguide channel; and a second reflector of the two reflectors is offset a second distance from a second longitudinal side of the waveguide channel, the second distance not being equal to the first distance.

Example 5. The apparatus of any one of the preceding Examples, wherein the second distance is at least three times larger than the first distance.

Example 6. The apparatus of any one of the preceding Examples, wherein the two reflectors each have a height that is greater than a height of the waveguide channel.

Example 7. The apparatus of any one of the preceding Examples, wherein: the hollow channel forms an approximately rectangular shape along a longitudinal direction of the waveguide channel; and the plurality of slot antennas are offset a non-uniform distance from a centerline of the hollow channel, the centerline being parallel with the longitudinal direction of the waveguide channel.

Example 8. The apparatus of Example 7, wherein the plurality of slot antennas is evenly distributed along the longitudinal direction.

Example 9. The apparatus of any one of the preceding Examples, wherein the antenna element is electrically coupled to the dielectric from a floor of the waveguide channel.

Example 10. The apparatus of any one of the preceding Examples, wherein a floor of the hollow channel is formed by a printed circuit board (PCB).

Example 11. The apparatus of any one of the preceding Examples, wherein the two reflectors have an approximately rectangular shape.

Example 12. A system comprising: an antenna element; a device configured to transmit or receive electromagnetic signals via the antenna element, the device comprising: a plurality of waveguide channels, each waveguide channel including a hollow channel for a dielectric, the hollow channel including a plurality of slot antennas, each of the slot antennas comprising an opening through a surface of the waveguide channel that defines the hollow channel, each of the slot antennas being operably connected with the dielectric; and a plurality of reflectors, the plurality of reflectors being positioned adjacent to and offset from each longitudinal side of each waveguide channel, the plurality of reflectors and the plurality of waveguide channel being arranged to produce a particular radiation pattern for the antenna element that is electrically coupled to the dielectric from a floor of the hollow channel of each waveguide channel.

Example 13. The system of Example 12, wherein the system comprises a vehicle and the device comprises a radar system.

Example 14. The system of Example 12 or 13, wherein the plurality of reflectors comprises a single structure.

Example 15. The system of Example 14, wherein the plurality of waveguide channels comprises another single structure.

Example 16. A method comprising: forming a plurality of waveguide channels, each waveguide channel including a hollow channel for a dielectric, the hollow channel including a plurality of slot antennas, each of the slot antennas comprising an opening through a surface of the waveguide channel that defines the hollow channel, each of the slot antennas being operably connected with the dielectric; forming a plurality of reflectors; and assembling the plurality of waveguide channels and the plurality of reflectors onto a printed circuit board (PCB) to form a device configured to transmit or receive electromagnetic signals via an antenna element, the plurality of reflectors being positioned adjacent to and offset from each longitudinal side of each waveguide channel, the plurality of reflectors and the plurality of waveguide channels being arranged to produce a particular radiation pattern for the antenna element that is electrically coupled to the dielectric from a floor of the hollow channel of each waveguide channel.

Example 17. The method of Example 16, wherein: each waveguide channel is formed by stamping a metal sheet and assembled onto the PCB using solder; and the plurality of reflectors comprises a single structure that is attached or held in place to the PCB using at least one of screws, adhesive, or a radome structure.

Example 18. The method of Example 17, wherein the single structure comprises a molded or three-dimensionally printed material, the material comprising at least one of aluminum, plated plastic, or conductive plastic.

Example 19. The method of Example 16, wherein: the plurality of waveguide channels comprises a single structure; the plurality of reflectors comprises another single structure; and the single structure and the other single structure comprising hydroformed metal plates.

Example 20. The method of Example 16, wherein two reflectors of the plurality of reflectors are offset an unequal distance from each longitudinal side of each waveguide channel of the plurality of waveguide channels.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. An apparatus comprising:
   a waveguide channel that includes a hollow channel for a dielectric, the hollow channel including a plurality of slot antennas, each of the slot antennas comprising an opening through a surface of the waveguide channel that defines the hollow channel, each of the slot antennas being operably connected with the dielectric; and
   two reflectors positioned adjacent to and offset from each longitudinal side of the waveguide channel, the reflectors and the waveguide channel being arranged to produce a particular radiation pattern for an antenna element that is electrically coupled to the dielectric, wherein:
      a first reflector of the two reflectors is offset a first distance from a first longitudinal side of the waveguide channel, and
      a second reflector of the two reflectors is offset a second distance from a second longitudinal side of the waveguide channel, the second distance not being equal to the first distance.

2. The apparatus of claim 1, wherein the two reflectors are not part of a ground plane of the waveguide channel.

3. The apparatus of claim 1, wherein the two reflectors are offset an equal distance from each longitudinal side of the waveguide channel.

4. The apparatus of claim 1, wherein the second distance is at least three times larger than the first distance.

5. The apparatus of claim 1, wherein the two reflectors each have a height that is greater than a height of the waveguide channel.

6. The apparatus of claim 1, wherein:
   the hollow channel forms an approximately rectangular shape along a longitudinal direction of the waveguide channel; and
   the plurality of slot antennas are offset a non-uniform distance from a centerline of the hollow channel, the centerline being parallel with the longitudinal direction of the waveguide channel.

7. The apparatus of claim 6, wherein the plurality of slot antennas is evenly distributed along the longitudinal direction.

8. The apparatus of claim 1, wherein the antenna element is electrically coupled to the dielectric from a floor of the waveguide channel.

9. The apparatus of claim 1, wherein a floor of the hollow channel is formed by a printed circuit board (PCB).

10. The apparatus of claim 1, wherein the two reflectors have an approximately rectangular shape.

11. A system comprising:
    an antenna element;
    a device configured to transmit or receive electromagnetic signals via the antenna element, the device comprising:

a plurality of waveguide channels, each waveguide channel including a hollow channel for a dielectric, the hollow channel including a plurality of slot antennas, each of the slot antennas comprising an opening through a surface of the waveguide channel that defines the hollow channel, each of the slot antennas being operably connected with the dielectric;

a first plurality of reflectors, each of the first plurality of reflectors being positioned adjacent to and offset a first distance from a first longitudinal side of each waveguide channel;

a second plurality of reflectors, each of the second plurality of reflectors being positioned adjacent to and offset a second distance from a second longitudinal side of each waveguide channel; and wherein first plurality of reflectors, the second plurality of reflectors, and the plurality of waveguide channels are arranged to produce a particular radiation pattern for the antenna element that is electrically coupled to the dielectric from a floor of the hollow channel of each waveguide channel.

12. The system of claim 11, wherein the system comprises a vehicle and the device comprises a radar system.

13. The system of claim 11, wherein the plurality of reflectors comprises a single structure.

14. The system of claim 13, wherein the plurality of waveguide channels comprises another single structure.

15. A method comprising:

forming a plurality of waveguide channels, each waveguide channel including a hollow channel for a dielectric, the hollow channel including a plurality of slot antennas, each of the slot antennas comprising an opening through a surface of the waveguide channel that defines the hollow channel, each of the slot antennas being operably connected with the dielectric;

forming a plurality of reflectors; and assembling the plurality of waveguide channels and the plurality of reflectors onto a printed circuit board (PCB) to form a device configured to transmit or receive electromagnetic signals via an antenna element, the plurality of reflectors being positioned adjacent to and offset from each longitudinal side of each waveguide channel, the plurality of reflectors and the plurality of waveguide channels being arranged to produce a particular radiation pattern for the antenna element that is electrically coupled to the dielectric from a floor of the hollow channel of each waveguide channel, wherein two reflectors of the plurality of reflectors are offset an unequal distance from each longitudinal side of each waveguide channel of the plurality of waveguide channels.

16. The method of claim 15, wherein:

each waveguide channel is formed by stamping a metal sheet and assembled onto the PCB using solder; and the plurality of reflectors comprises a single structure that is attached or held in place to the PCB using at least one of screws, adhesive, or a radome structure.

17. The method of claim 16, wherein the single structure comprises a molded or three-dimensionally printed material, the material comprising at least one of aluminum, plated plastic, or conductive plastic.

18. The method of claim 15, wherein:

the plurality of waveguide channels comprises a single structure;

the plurality of reflectors comprises another single structure; and the single structure and the other single structure comprising hydroformed metal plates.

* * * * *